(12) United States Patent
Lee

(10) Patent No.: US 9,125,160 B2
(45) Date of Patent: Sep. 1, 2015

(54) WIRELESS POWER RECEIVER AND METHOD FOR SETTING SLEEP MODE IN WIRELESS POWER RECEIVER

(71) Applicant: Samsung Electronics Co., Ltd., Gyeonggi-do (KR)

(72) Inventor: Kyung-Woo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/058,963

(22) Filed: Oct. 21, 2013

(65) Prior Publication Data

US 2014/0113689 A1 Apr. 24, 2014

(30) Foreign Application Priority Data

Oct. 19, 2012 (KR) .................. 10-2012-0116391
May 3, 2013 (KR) .................. 10-2013-0050313

(51) Int. Cl.
*H04W 52/02* (2009.01)
(52) U.S. Cl.
CPC ............... *H04W 52/0277* (2013.01)

(58) Field of Classification Search
CPC ................................. H04W 52/0277
USPC ........... 455/573, 127.1, 522; 315/291; 362/20
See application file for complete search history.

(56) References Cited

U.S. PATENT DOCUMENTS

| 8,099,047 B2 | 1/2012 | David et al. |
| 2003/0013421 A1* | 1/2003 | Friman ..................... 455/127 |
| 2005/0170801 A1 | 8/2005 | Deolalikar et al. |
| 2010/0327766 A1* | 12/2010 | Recker et al. ............. 315/291 |
| 2011/0096709 A1 | 4/2011 | Jeyaseelan |
| 2011/0187314 A1 | 8/2011 | Kim |

FOREIGN PATENT DOCUMENTS

KR 1020100134843 12/2010

* cited by examiner

*Primary Examiner* — Phuoc H Doan
(74) *Attorney, Agent, or Firm* — The Farrell Law Firm, P.C.

(57) ABSTRACT

A method for setting a sleep mode in a wireless power receiver that may receive wireless charging power from a wireless power transmitter is provided, including receiving wireless charging power from the wireless power transmitter, measuring a charging voltage based on the received wireless charging power, if the measured voltage reaches a preset first voltage, measuring a duration for which the measured voltage is maintained, and transitioning to the sleep mode if the duration exceeds a preset time.

24 Claims, 18 Drawing Sheets

WIRELESS POWER RECEIVER AND METHOD FOR SETTING SLEEP MODE IN WIRELESS POWER RECEIVER

PRIORITY

This application claims priority under 35 U.S.C. §119(a) to a Korean patent application filed in the Korean Intellectual Property Office on Oct. 19, 2012 and assigned Serial No. 10-2012-0116391, and a Korean patent application filed in the Korean Intellectual Property Office on May 3, 2013 and assigned Serial No. 10-2013-0050313, the contents of each of which are incorporated herein by reference.

BACKGROUND OF THE INVENTION

1. Field of the Invention

The present invention relates generally to a wireless charging network, and more particularly, to a wireless power receiver and a method for setting a sleep mode in the wireless power receiver that may receive wireless charging power from a wireless power transmitter.

2. Description of the Related Art

A mobile terminal, such as a cellular phone or a Personal Digital Assistant (PDA), is powered by a rechargeable battery, for mobility purposes. In order to charge the battery, electrical energy is supplied to the battery of the mobile terminal using a separate charging device. Typically, the charging device and the battery have separate contact terminals mounted on their outer surfaces, such that they may be electrically connected when their contact terminals contact each other.

Since the contact terminals in this contact charging technique protrude outside, they are apt to be contaminated by foreign substances and exposure to moisture, causing a failure in battery charging.

In order to address these and other disadvantages, wireless charging or contactless charging technologies have been developed and used in many electronic devices.

In the wireless charging technology that uses wireless power transmission/reception, a battery of a mobile phone is automatically charged if the mobile phone is placed on a charging pad without being connected to a charging device via a separate charging connector. Generally, the wireless charging technology is well known to the public in application to wireless electric toothbrushes or cordless electric shavers. The wireless charging technology may increase the waterproof functionalities of electronic devices as it may wirelessly charge the electronic devices. In addition, the wireless charging technology may improve the portability of electronic devices by eliminating the unnecessary wired charger. As a result, the related technologies are expected to significantly evolve even in the coming electric car era.

Wireless charging technologies may be roughly classified into a coil-based electromagnetic induction scheme, a resonance scheme, and a radio radiation scheme (also known as a Radio Frequency (RF)/micro wave radiation scheme) that delivers electrical energy by converting it into microwaves.

To this point, the electromagnetic induction scheme has been primarily used. With the recent successful experiments of wirelessly transmitting power by tens of meters using microwaves, a new era in which all electronic products may be wirelessly charged anytime and anywhere appears to be coming in the near future.

The electromagnetic induction-based power transmission method is a scheme of transmitting power between a primary coil and a secondary coil. An induced current occurs when a magnet moves around a coil. Based on this principle, a transmitter may generate a magnetic field, and a receiver may generate electrical energy as a current is induced due to a change in the magnetic field. This phenomenon is called an electromagnetic induction phenomenon, and the electromagnetic induction-based power transmission method has excellent energy transfer efficiency.

The resonance scheme provides a system in which electricity is wirelessly transferred to an electronic device using the resonance-based power transmission principle even though the electronic device is distanced several meters from a charging device. The wireless charging system is based on the physics concept called 'resonance', whereby electromagnetic waves containing electrical energy is caused to resonate. The resonating electrical energy is directly delivered only to an electronic device having a resonant frequency, and the unused electrical energy may be re-absorbed as an electromagnetic field instead of being spread into the air. Therefore, unlike the electromagnetic waves, the electrical energy does not seem to affect nearby machines and human bodies.

Although many studies on the wireless charging scheme have been performed, no standard has been proposed for wireless charging priority, search for a wireless power transmitter/receiver, selection of a communication frequency between a wireless power transmitter and a wireless power receiver, adjustment of wireless power, selection of a matching circuit, and distribution of a communication time for each of wireless power receivers in one charging cycle, for example.

While a wireless power transmitter is charging a wireless power receiver, the wireless power receiver may periodically transmit a dynamic signal to the wireless power transmitter, allowing the wireless power transmitter to adjust its transmission power level. However, the wireless power receiver may transmit the dynamic signal at the same intervals even after the power level is stabilized, causing an unnecessary waste of power.

Accordingly, there is a need for a method and apparatus to prevent the unnecessary waste of power after stabilization of a charging power level of the wireless power receiver.

SUMMARY OF THE INVENTION

The present invention has been made to address at least the above-mentioned problems and/or disadvantages and to provide at least the advantages described below. Accordingly, an aspect of the present invention is to provide a wireless power receiver and a method for setting a sleep mode in the same, for changing a transmission cycle of a Power Reception Unit (PRU) dynamic signal transmitted to a wireless power transmitter, if a charging power level is stabilized while the wireless power transmitter charges the wireless power receiver.

In accordance with an aspect of the present invention, there is provided a method for setting a sleep mode in a wireless power receiver that may receive wireless charging power from a wireless power transmitter, which may include receiving wireless charging power from the wireless power transmitter, measuring a charging voltage based on the received wireless charging power, if the measured voltage reaches a preset first voltage, measuring a duration for which the measured voltage is maintained, and transitioning to the sleep mode if the duration exceeds a preset time.

In accordance with another aspect of the present invention, there is provided a method for setting a sleep mode in a wireless power receiver that may receive wireless charging power from a wireless power transmitter, which may include receiving wireless charging power from the wireless power transmitter, measuring a charging voltage based on the received wireless charging power, and transitioning to the sleep mode if the measured voltage is maintained for at least a preset time.

In accordance with another aspect of the present invention, there is provided a wireless power receiver for performing wireless charging by receiving wireless charging power from a wireless power transmitter, which may include a power-receiving unit configured to receive wireless charging power from the wireless power transmitter, and a controller configured to measure a charging voltage based on the received wireless charging power, if the measured voltage reaches a preset first voltage, measuring a duration for which the measured voltage is maintained, and transitioning to the sleep mode if the duration exceeds a preset time.

In accordance with another aspect of the present invention, there is provided a wireless power receiver for performing wireless charging by receiving wireless charging power from a wireless power transmitter, which may include a power-receiving unit configured to receive wireless charging power from the wireless power transmitter, and a controller configured to measure a charging voltage based on the received wireless charging power, and transitioning to the sleep mode if the measured voltage lasts for at least a preset time.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention is provided for illustration purposes only, and not to limit the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
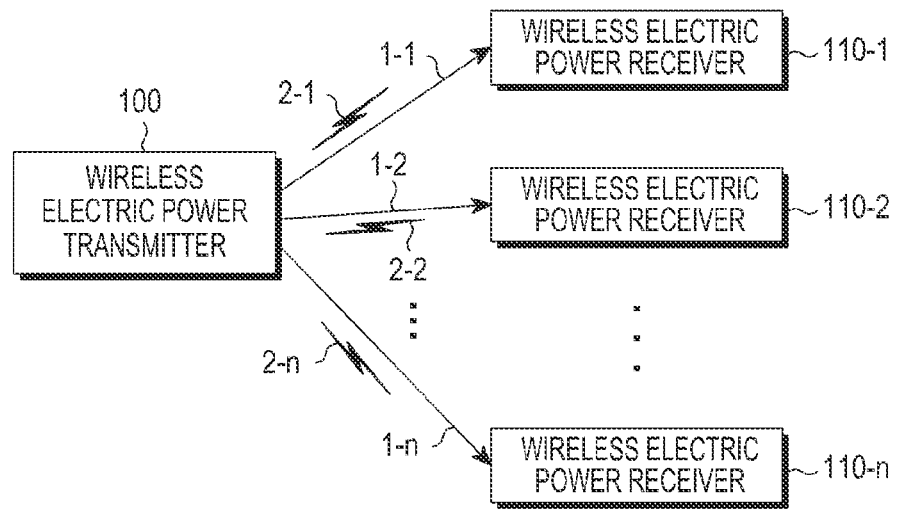
FIG. 1 illustrates the overall operation of a wireless charging system.

FIG. 1 illustrates the overall operation of a wireless charging system. As illustrated in FIG. 1, the wireless charging system may include a wireless power transmitter 100 and at least one wireless power receiver 110-1, 110-2 and 110-n.

The wireless power transmitter 100 may wirelessly transmit power 1-1, 1-2 and 1-n to the wireless power receivers 110-1, 110-2 and 110-n, respectively. More specifically, the wireless power transmitter 100 may wirelessly transmit the power 1-1, 1-2 and 1-n only to the wireless power receivers, which may be authenticated or authorized through an authentication procedure with the wireless power transmitter 100.

The wireless power transmitter 100 electrically connects to the wireless power receivers 110-1, 110-2 and 110-n. For example, the wireless power transmitter 100 may transmit wireless power in the form of electromagnetic wave to the wireless power receivers 110-1, 110-2 and 110-n.

The wireless power transmitter 100 may perform two-way communication with the wireless power receivers 110-1, 110-2 and 110-n. The wireless power transmitter 100 and the wireless power receivers 110-1, 110-2 and 110-n may process or transmit and receive packets 2-1, 2-2 and 2-n, which are configured in the form of a frame, which will be described in detail below. The wireless power receivers may be realized as, for example, mobile communication terminals, Personal Digital Assistants (PDAs), Personal Multimedia Players (PMPs), and smart phones.

The wireless power transmitter 100 may wirelessly provide power to a plurality of wireless power receivers 110-1, 110-2 and 110-n. For example, the wireless power transmitter 100 may transmit power to the plurality of wireless power receivers 110-1, 110-2 and 110-n using the resonance scheme. If the wireless power transmitter 100 adopts the resonance scheme, the distance between the wireless power transmitter 100 and the plurality of wireless power receivers 110-1, 110-2 and 110-n may be 30m or less. If the wireless power transmitter 100 adopts the electromagnetic induction scheme, the distance between the wireless power transmitter 100 and the plurality of wireless power receivers 110-1, 110-2 and 110-n may be 10cm or less.

The wireless power receivers 110-1, 110-2 and 110-n may receive wireless power from the wireless power transmitter 100 and charge a battery mounted therein using the received power. The wireless power receivers 110-1, 110-2 and 110-n may transmit, to the wireless power transmitter 100, a signal for requesting transmission of wireless power, information needed to receive wireless power, wireless power receiver's status information, and control information for the wireless power transmitter 100, for example.

The wireless power receivers 110-1, 110-2 and 110-n may send a message indicating their charging state to the wireless power transmitter 100.

The wireless power transmitter 100 may include a display means such as a display, and may display a state of each of the wireless power receivers 110-1, 110-2 and 110-n based on the message received from each of the wireless power receivers 110-1, 110-2 and 110-n. In addition, the wireless power transmitter 100 may also display the expected time that each of the wireless power receivers 110-1, 110-2 and 110-n will be fully charged.

The wireless power transmitter 100 may transmit a control signal for disabling a wireless charging function, to each of the wireless power receivers 110-1, 110-2 and 110-n. Upon receiving the control signal for disabling a wireless charging function from the wireless power transmitter 100, the wireless power receiver may disable its wireless charging function.

Figure 2:
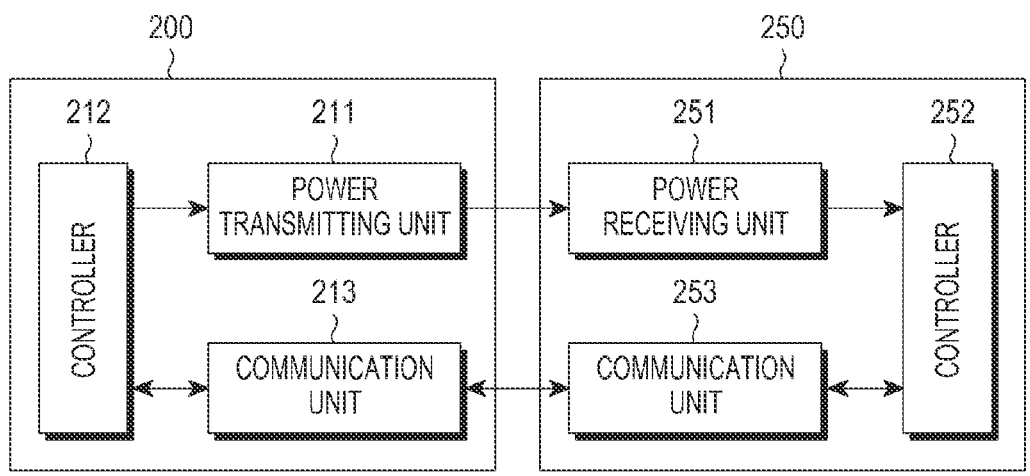
FIG. 2 is a block diagram of a wireless power transmitter and a wireless power receiver according to an embodiment of the present invention.

FIG. 2 is a block diagram of a wireless power transmitter and a wireless power receiver according to an embodiment of the present invention.

As illustrated in FIG. 2, a wireless power transmitter (or Power Transmission Unit (PTU)) 200 may include a power-transmitting unit 211, a controller 212 and a communication unit 213. A wireless power receiver (or Power Reception Unit (PRU)) 250 may include a power-receiving unit 251, a controller and a communication unit 253.

The power-transmitting unit 211 may provide the power required by the wireless power transmitter 200, and wirelessly supply the power to the wireless power receiver 250. The power-transmitting unit 211 may supply the power in the form of an Alternating Current (AC) waveform, and may supply the power in the form of a Direct Current (DC) waveform and convert it into power in the form of an AC waveform using an inverter to supply the power in the form of the AC waveform. The power-transmitting unit 211 may be implemented in the form of a built-in battery, or is implemented in the form of a power-receiving interface to receive power from the outside and supply it to other components. It will be apparent to those of ordinary skill in the art that the power-transmitting unit 211 is not limited as long as it is a means capable of supplying power in the form of an AC waveform.

In addition, the power-transmitting unit 211 may supply AC power to the wireless power receiver 250 in the form of electromagnetic wave. The power-transmitting unit 211 may further include an additional resonance circuit, such that it may transmit or receive predetermined electromagnetic waves. If the power-transmitting unit 211 is implemented with a resonance circuit, an inductance L of a loop coil of the resonance circuit may be subject to change. It will be apparent to those of ordinary skill in the art that the power-transmitting unit 211 is not limited as long as it is capable of transmitting and receiving electromagnetic waves.

The controller 212 may control the overall operation of the wireless power transmitter 200. The controller 212 may control the overall operation of the wireless power transmitter 200 using an algorithm, a program or an application, each of which is read from a storage unit (not shown) and required for the control. The controller 212 may be implemented in the form of Central Processing Unit (CPU), microprocessor, or minicomputer, for example.

The communication unit 213 may communicate with the wireless power receiver 250 using a communication scheme. The communication unit 213 may communicate with the communication unit 253 in the wireless power receiver 250, such as by using Near Field Communication (NFC), Zigbee®, Infrared Data Association (IrDA), Visual Light Communication (VLC), Bluetooth®, or Bluetooth® Low Energy (BLE). The communication unit 213 may use a Carrier Sense Multiple Access/Collision Avoidance (CSMA/CA) algorithm. These communication schemes may be merely illustrative, and in terms of the scope, embodiments of the present invention may not be limited to a specific communication scheme performed in the communication unit 213.

The communication unit 213 may transmit a signal for information about the wireless power transmitter 200. The communication unit 213 may transmit the signal in a unicast, multicast or broadcast manner.

Table 1 illustrates a data structure of a signal transmitted by the wireless power transmitter 200 according to an embodiment of the present invention. The wireless power transmitter 200 may transmit a signal having the following frame structure at preset intervals, and the signal may be referred to as a Notice signal.

TABLE 1

| frame type | protocol version | sequence number | network ID | Rx to Report (schedule mask) | Reserved | Number of Rx |
|---|---|---|---|---|---|---|
| Notice | 4 bit | 1 Byte | 1 Byte | 1 Byte | 5 bit | 3 bit |

In Table 1, 'frame type' indicates a type of the signal, and indicates that the signal is a Notice signal. A 'protocol version' field indicates a protocol type of a communication scheme, and is allocated, for example, 4 bits. A 'sequence number' field indicates a sequential order of the signal, and is allocated, for example, 1 byte. A sequence number may increase one by one to correspond to, for example, a transmission/reception phase of the signal. A 'network ID' field indicates a network ID of the wireless power transmitter 200, and is allocated, for example, 1 byte. A ax to Report(schedule mask)' field indicates wireless power receivers scheduled make a report to the wireless power transmitter 200, and is allocated, for example, 1 byte.

Table 2 illustrates the 'Rx to Report(schedule mask)' field according to an embodiment of the present invention.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 may correspond to wireless power receivers #1 to #8. The 'Rx to Report(schedule mask)' field may be implemented such that a wireless power receiver, a number of whose schedule mask is marked as '1', creates a report.

A 'Reserved' field is reserved for its future use, and may be allocated, for example, 5 bits. A 'Number of Rx' field indicates the number of wireless power receivers around the wireless power transmitter 200, is allocated, for example, 3 bits.

The communication unit 213 may receive power information from the wireless power receiver 250. The power information may include at least one of the wireless power receiver's capacity, battery level, charging count, usage, battery capacity, and battery percentage.

The communication unit 213 may transmit a charging function control signal for controlling a charging function of the wireless power receiver 250. The charging function control signal may be for controlling the power-receiving unit 251 in the wireless power receiver 250 to enable or disable the charging function of the wireless power receiver 250. As will be described in detail below, the power information may include information regarding insertion of a wired charging terminal, transition from Service Availability (SA) mode to Non-Service Availability (NSA) mode, and release of error situation, for example.

The communication unit 213 may receive a signal not only from the wireless power receiver 250, but also from another wireless power transmitter (not shown). For example, the communication unit 213 may receive a Notice signal in a form of the frame in Table 1 from another wireless power transmitter.

Although it is assumed in FIG. 2 that the wireless power transmitter 200 communicates in an out-band manner as the power-transmitting unit 211 and the communication unit 213 are configured as different hardware, this is merely illustrative. Alternatively, the wireless power transmitter 200 may communicate in an in-band manner, as the power-transmitting unit 211 and the communication unit are configured as a single piece of hardware.

The wireless power transmitter 200 and the wireless power receiver 250 may transmit and receive various signals. Accordingly, a charging process is performed, in which the wireless power receiver 250 may join the wireless power network managed by the wireless power transmitter 200 and transmit/receive wireless power.

Figure 3:
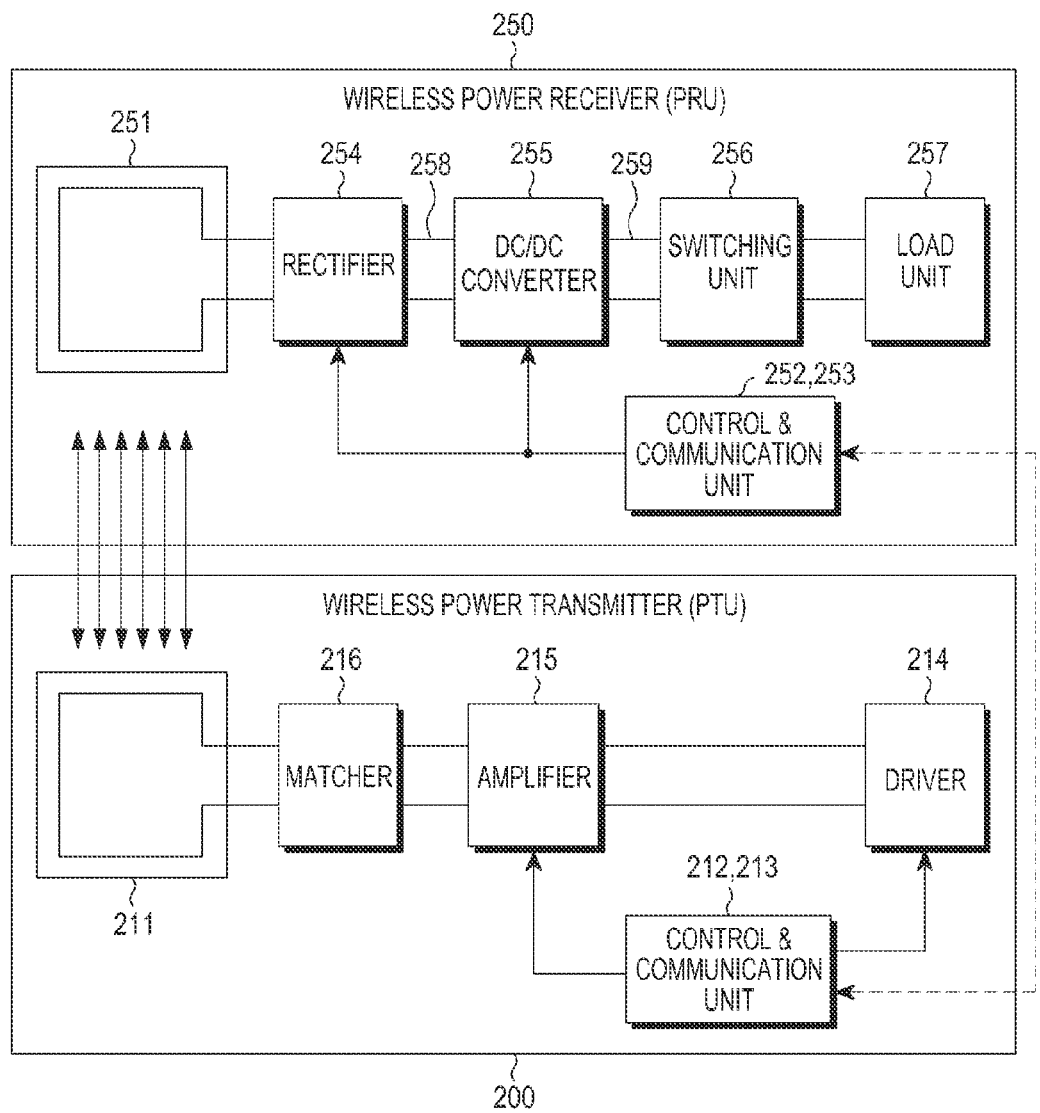
FIG. 3 is a detailed block diagram of a wireless power transmitter and a wireless power receiver according to an embodiment of the present invention.

FIG. 3 is a detailed block diagram of a wireless power transmitter and a wireless power receiver according to an embodiment of the present invention.

As illustrated in FIG. 3, the wireless power transmitter (or PTU) 200 may include the power-transmitting unit 211, a control & communication unit 212/213, a driver 214, an amplifier 215, and a matcher 216. The wireless power receiver (or PRU) 250 may include the power-receiving unit 251, a control & communication unit 252/253, a rectifier 254, a DC/DC converter 255, a switching unit 256, and a load unit 257.

The driver 214 may output DC power having a preset voltage value. The voltage value of the DC power output from the driver 214 may be controlled by the control & communication unit 212/213.

A DC current output from the driver 214 may be output to the amplifier 215. The amplifier 215 may amplify the DC current with a preset gain. In addition, the amplifier 215 may convert the DC power into AC power based on a signal received from the control & communication unit 212/213. Accordingly, the amplifier 215 may output AC power.

The matcher 216 may perform impedance matching. For example, the matcher 216 may adjust the impedance seen from the matcher 216 to ensure high efficiency or high output for the output power. The matcher 216 may adjust the impedance under control of the control & communication unit 212/213. The matcher 216 may include at least one of a coil and a capacitor. The control & communication unit 212/213 may control its connection to at least one of the coil and the capacitor, and perform impedance matching according thereto.

The power-transmitting unit 211 may transmit the input AC power to the power-receiving unit 251. The power-transmitting unit 211 and the power-receiving unit 251 may be implemented with resonance circuits having the same resonant frequency. For example, the resonant frequency is determined as 6.78 MHz.

The control & communication unit 212/213 may communicate with the control & communication unit 252/253 in the wireless power receiver 250, and may perform two-way communication using a frequency of, for example, 2.4 GHz.

The power-receiving unit 251 may receive charging power. The rectifier 254 may rectify the wireless power received at the power-receiving unit 251 into DC power, and may be implemented in the form of, for example, a bridge diode. The DC/DC converter 255 may convert the rectified power with a preset gain. For example, the DC/DC converter 255 converts the rectified power so that a voltage at its output terminal 259 is 5V. The minimum and maximum values of a voltage, which can be applied to an input terminal 258 of the DC/DC converter 255, may be set in advance.

The switching unit 256 may connect the DC/DC converter 255 to the load unit 257. The switching unit 256 may maintain its on/off state under control of the controller 252. The load unit 257 may store the converted power received from the DC/DC converter 255, if the switching unit 256 is turned on.

Figure 4:
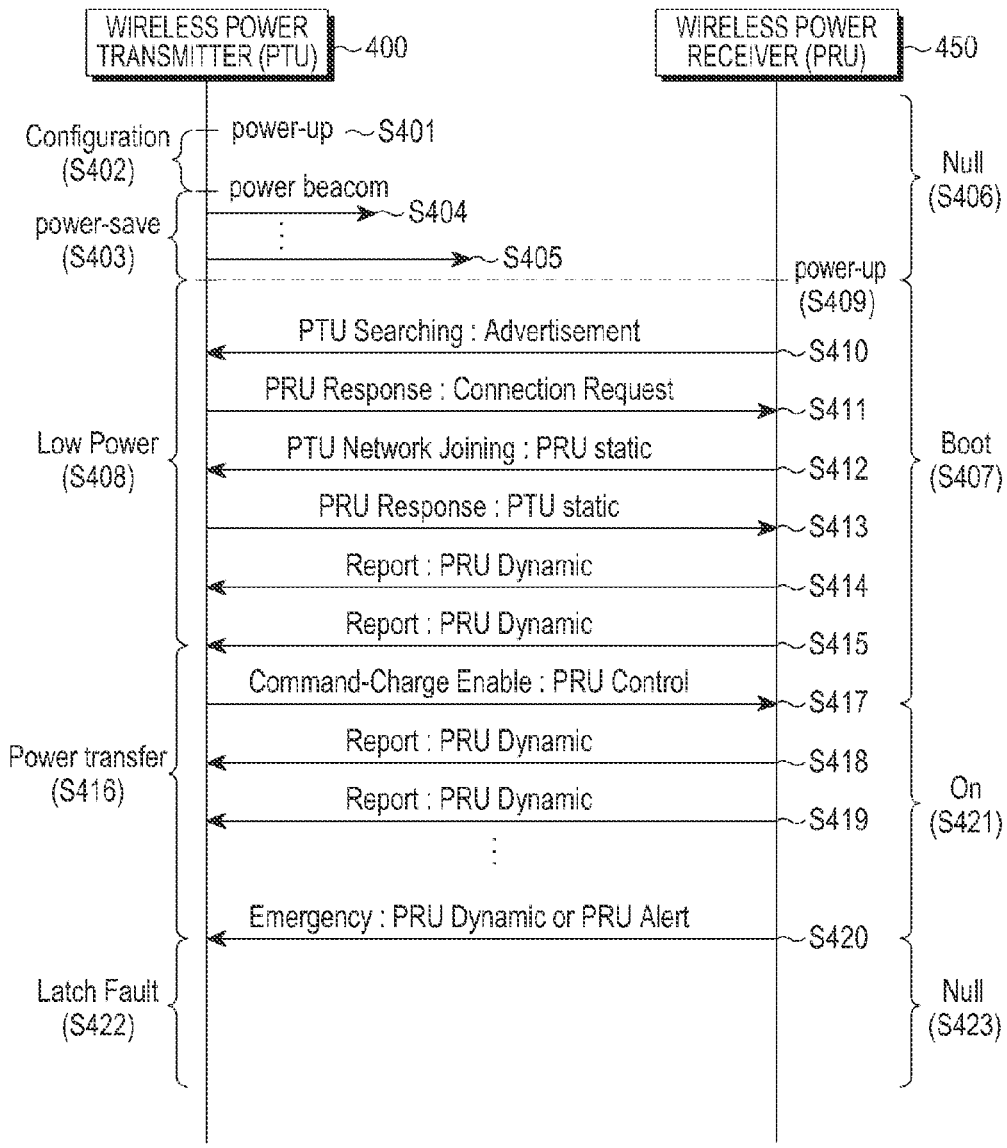
FIG. 4 illustrates an operation of a wireless power transmitter and a wireless power receiver according to an embodiment of the present invention.

FIG. 4 illustrates an operation of a wireless power transmitter and a wireless power receiver according to an embodiment of the present invention. As illustrated in FIG. 4, the wireless power transmitter (or PTU) 400 may apply power or may be powered up in step S401. Upon power up, the wireless power transmitter 400 may set its configuration in step S402.

The wireless power transmitter 400 may enter power save mode in step S403. In the power save mode, the wireless power transmitter 400 may apply different power beacons for detection in their own cycles, and a detailed description thereof will be made with reference to FIG. 6. For example, as illustrated in FIG. 4, the wireless power transmitter 400 may apply power beacons 404 and 405 for detection in steps S404 and S405, and the power beacons 404 and 405 for detection may be different from each other in terms of the power value (or an amount of power). Some or all of the power beacons 404 and 405 for detection may have the power, with which a communication unit of a wireless power receiver (or PRU) 450 may be driven. For example, the wireless power receiver 450 communicates with the wireless power transmitter 400 by driving its communication unit based on some or all of the power beacons 404 and 405 for detection. This state may be referred to as a Null state in step S406.

The wireless power transmitter 400 may detect a change in load due to placement of the wireless power receiver 450. The wireless power transmitter 400 may enter a low-power mode in step S408. A detailed description of the low-power mode will also be made with reference to FIG. 6. The wireless power receiver 450 may drive its communication unit based on the power received from the wireless power transmitter 400 in step S409.

The wireless power receiver 450 may transmit a PTU searching signal to the wireless power transmitter 400 in step S410. The wireless power receiver 450 may transmit the PTU searching signal, using a BLE-based Advertisement signal. The wireless power receiver 450 periodically may transmit the PTU searching signal, and may continue the transmission until it may receive a response signal from the wireless power transmitter 400, or until a preset time is reached.

Upon receiving the PTU searching signal from the wireless power receiver 450, the wireless power transmitter 400 may transmit a PRU response signal in step S411. The PRU response signal may be used to request a connection between the wireless power transmitter 400 and the wireless power receiver 450.

The wireless power receiver 450 may transmit a PRU static signal in step S412. The PRU static signal may indicate a state of the wireless power receiver 450, and with use of the PRU static signal, the wireless power receiver 450 may request to join the wireless power network managed by the wireless power transmitter 400.

The wireless power transmitter 400 may transmit a PTU static signal in step S413. The PTU static signal transmitted by the wireless power transmitter 400 may indicate the capacity of the wireless power transmitter 400.

Once the wireless power receiver 450 changes the PRU and PTU static signals with the wireless power transmitter 400, the wireless power receiver 450 may periodically transmit a PRU dynamic signal in steps S414 and S415. The PRU dynamic signal may include information about at least one parameter measured by the wireless power receiver 450. For example, the PRU dynamic signal may include information about a voltage at a rear end of a rectifier of the wireless power receiver 450. The state of the wireless power receiver 450 is referred to as a boot state in step S407.

The wireless power transmitter 400 may enter power transfer mode in step S416, and the wireless power transmitter 400 may transmit a PRU control signal, which is a command signal for enabling the wireless power receiver 450 to perform charging in step S417. The wireless power transmitter 400 may transmit charging power in the power transfer mode.

The PRU control signal transmitted by the wireless power transmitter 400 may include information for enabling/disabling and information for permitting the charging of the wireless power receiver 450. The PRU control signal may be transmitted when the wireless power transmitter 400 permits a change in the state of the wireless power receiver 450, or may be transmitted at preset intervals, for example, at intervals of 250ms. The wireless power receiver 450 may change its configuration depending on the PRU control signal, and transmit a PRU dynamic signal for reporting its state in steps S418 and S419). The PRU dynamic signal transmitted by the wireless power receiver 450 may include information about at least one of voltage, current, PRU state and temperature. The state of the wireless power receiver 450 is set as an 'On' state in step S421.

The PRU dynamic signal has the data structure defined in Table 3.

TABLE 3

| Field | octets | description | use | units |
|---|---|---|---|---|
| optional fields | 1 | defines which optional fields are populated | mandatory | |
| $V_{rect}$ | 2 | voltage at diode output | mandatory | mV |
| $I_{rect}$ | 2 | current at diode output | mandatory | mA |
| $V_{out}$ | 2 | voltage at charge/battery port | optional | mV |
| $I_{out}$ | 2 | current at charge/battery port | optional | mA |
| temperature | 1 | temperature of PRU | optional | Deg C. from −40 C. |
| $V_{rect\,min\,dyn}$ | 2 | $V_{rect}$ low limit(dynamic value) | optional | mV |
| $V_{rect\,set\,dyn}$ | 2 | desired Vrect (dynamic value) | optional | mV |
| $V_{rect\,high\,dyn}$ | 2 | $V_{rect}$ high limit (dynamic value) | optional | mV |
| PRU alert | 1 | warnings | mandatory | Bit field |
| RFU | 3 | undefined | | |

As illustrated in Table 3, the PRU dynamic signal may include at least one of information regarding optional fields, a voltage at a rear end of a rectifier of the wireless power receiver, a current at the rear end of the rectifier of the wireless power receiver, a voltage at a rear end of a DC/DC converter of the wireless power receiver, a current at the rear end of the DC/DC converter of the wireless power receiver, temperature information, the minimum voltage value at the rear end of the rectifier of the wireless power receiver, the optimal voltage value at the rear end of the rectifier of the wireless power receiver, the maximum voltage value at the rear end of the rectifier of the wireless power receiver, PRU alert information, and RFU information.

The alert information may be formed in the data structure defined in Table 4.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

As illustrated in Table 4, the alert information may include an 'over voltage' field, an 'over current' field, an 'over temperature' field, a 'charge complete' field, a 'TA detect (or detect insertion of wired charging terminal)' field, a 'transition (or transition to SA/NSA mode)' field, a 'restart request' field, and an RFU field.

Upon receiving the PRU control signal, the wireless power receiver 450 may perform charging. For example, if the wireless power transmitter 400 has power high enough to charge the wireless power receiver 450, the wireless power transmitter 400 may transmit a PRU control signal for enabling the charging. The PRU control signal may be transmitted every time the charging state is changed. The PRU control signal may be transmitted at intervals of, for example, 250ms, or may be transmitted when a parameter is changed. The PRU control signal may be set to be transmitted within a preset time (for example, 1 second) even though the parameter is not changed.

The wireless power receiver 450 may detect occurrence of errors. The wireless power receiver 450 may transmit an emergency signal to the wireless power transmitter 400 in step S420. The emergency signal may be transmitted in a PRU dynamic signal or may be transmitted in a PRU alert signal. For example, the wireless power receiver 450 may reflect the error situation in the PRU alert field of Table 3 and transmit it to the wireless power transmitter 400. Alternatively, the wireless power receiver 450 may transmit a single alert signal (for example, a PRU alert signal) indicating the error situation, to the wireless power transmitter 400. Upon receiving the emergency signal, the wireless power transmitter 400 may enter latch fault mode in step S422. The wireless power receiver 450 may enter null state in step S423.

Figure 5:
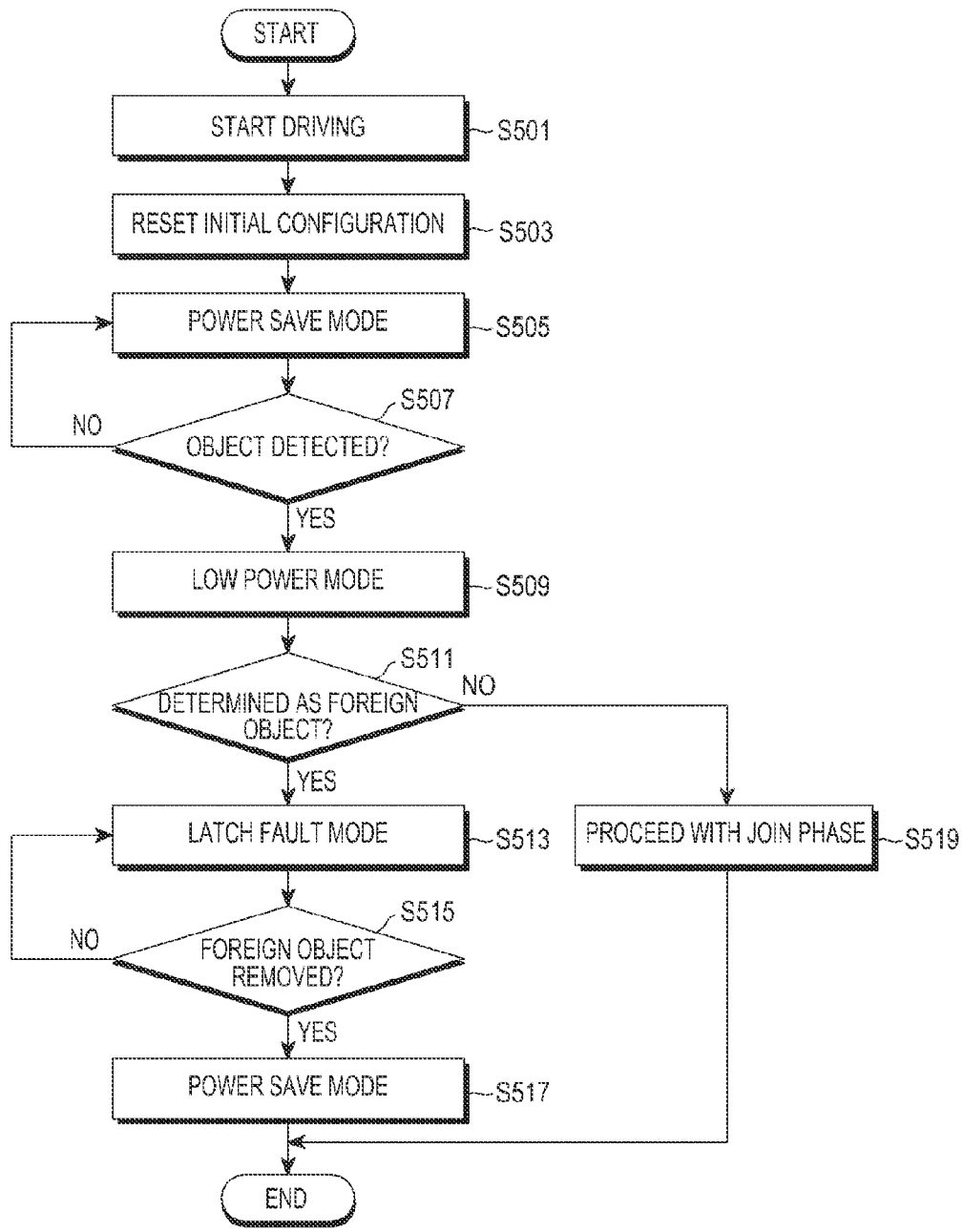
FIG. 5 illustrates an operation of a wireless power transmitter and a wireless power receiver according to another embodiment of the present invention.
Figure 6:
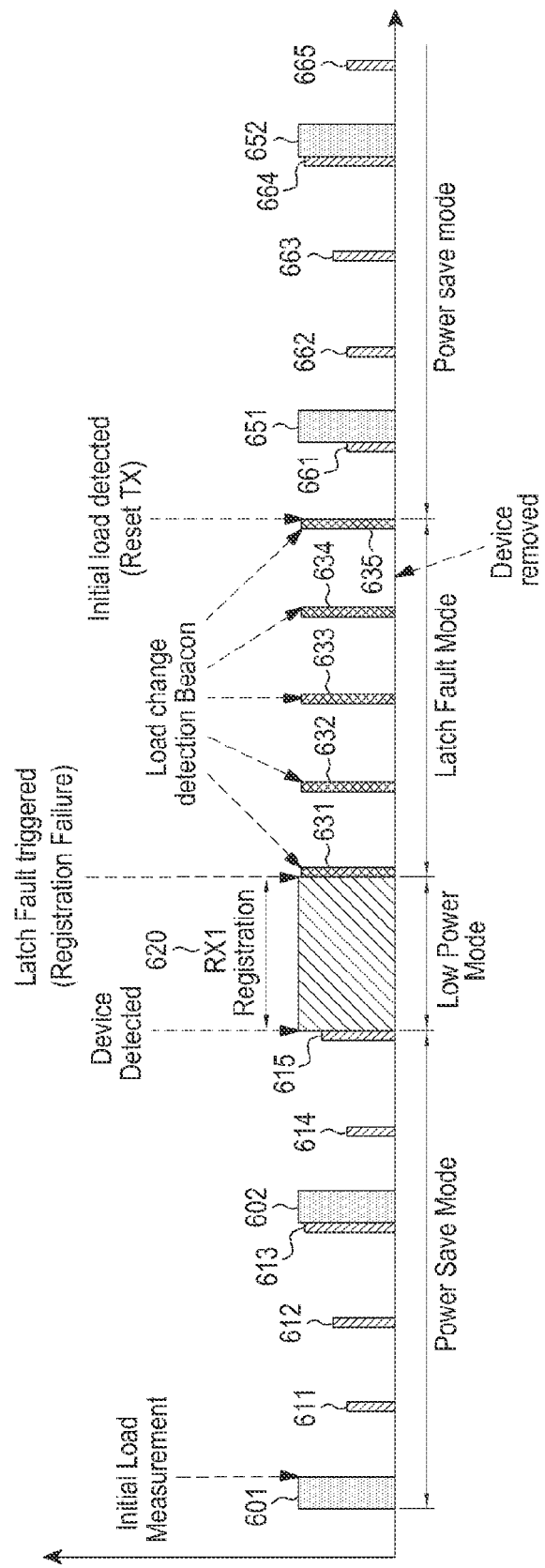
FIG. 6 illustrates the time axis of power applied by a wireless power transmitter.

FIG. 5 illustrates an operation of a wireless power transmitter and a wireless power receiver according to another embodiment of the present invention. FIG. 6 illustrates the time axis of power applied by the wireless power transmitter in FIG. 5.

As illustrated in FIG. 5, the wireless power transmitter may begin its driving, or may be powered up in step S501. In addition, the wireless power transmitter may reset its initial configuration in step S503. The wireless power transmitter may enter power save mode in step S505, which corresponds to a period in which the wireless power transmitter may apply different power, whose power values are different, to its power-transmitting unit. For example, the power save mode may correspond to a period in which the wireless power transmitter may apply second detection power 601 and 602 and third detection power 611, 612, 613, 614 and 615 in FIG. 6, to its power-transmitting unit.

The wireless power transmitter may periodically apply the second detection power 601 and 602 at a second cycle, and the wireless power transmitter may apply the second detection power 601 and 602 for a second period. The wireless power transmitter periodically may apply the third detection power 611, 612, 613, 614 and 615 at a third cycle, and the wireless power transmitter may apply the third detection power 611, 612, 613, 614 and 615 for a third period. Although it is assumed that power values of the third detection power 611, 612, 613, 614 and 615 may be different from each other, they may be optionally equal to each other.

For example, after outputting the third detection power 611, the wireless power transmitter may output the third detection power 612 that has the same power value as that of the third detection power 611. If the wireless power transmitter outputs the third detection power having the same power value in this manner, the third detection power has a power value with which the wireless power transmitter may detect the lowest-power wireless power receiver, for example, a wireless power receiver in a category #1 for lowest-power.

After outputting the third detection power 611, the wireless power transmitter may output the third detection power 612 that has a power value different from that of the third detection power 611. If the wireless power transmitter outputs the third detection power having different power values in this manner, the third detection power may have a power value with which the wireless power transmitter may detect wireless power receivers in categories #1 to #5. For example, the third detection power 611 may have a power value with which the wireless power transmitter may detect a wireless power receiver in category #5. The third detection power 612 may have a power value with which the wireless power transmitter may detect a wireless power receiver in category #3. The third detection power 613 may have a power value with which the wireless power transmitter may detect a wireless power receiver in category #1.

The second detection power 601 and 602 may correspond to power with which a wireless power receiver may be driven. More specifically, the second detection powers 601 and 602 may have a power value with which a control & communication unit of a wireless power receiver may be driven.

The wireless power transmitter may apply the second detection power 601 and 602 and the third detection power 611, 612, 613, 614 and 615 to a power-receiving unit at second and third cycles, respectively. If the wireless power receiver is put on the wireless power transmitter, the impedance seen at a certain point of the wireless power transmitter is changed. While applying the second detection power 601 and 602 and the third detection power 611, 612, 613, 614 and 615, the wireless power transmitter may detect a change in impedance. For example, while applying the third detection power 615, the wireless power transmitter may detect a change in impedance. In this manner, the wireless power transmitter may detect an object in step S507. If no object is detected (No in step S507), the wireless power transmitter maintains the power save mode in which it periodically may apply different power in step S505.

If an object is detected as the impedance is changed (Yes in step S507), the wireless power transmitter may enter low-power mode in step S509. The low-power mode corresponds to a mode in which the wireless power transmitter may apply driving power having a power value with which a control & communication unit of a wireless power receiver is driven. For example, in FIG. 6, the wireless power transmitter may apply driving power 620 to its power-transmitting unit.

The wireless power receiver may receive the driving power 620 and drives its control & communication unit with the received driving power 620. Based on the driving power 620, the wireless power receiver communicates with the wireless power transmitter using a communication scheme. For example, the wireless power receiver may transmit/receive data required for authentication, and based thereon, joins the wireless power network managed by the wireless power transmitter. However, if a foreign object other than the wireless power receiver is placed on the wireless power transmitter, data transmission/reception may not be performed. Accordingly, the wireless power transmitter may determine whether an object thereon is a foreign object in step S511. For example, upon failure to receive a response from the object for a period of time, the wireless power transmitter may determine the object as a foreign object.

If the object is determined as a foreign object (Yes in step S511), the wireless power transmitter may enter the latch fault mode in step S513. If the object is not determined as a foreign object (No in step S511), the wireless power transmitter may proceed with a join phase in step S519. For example, the wireless power transmitter periodically may apply first power 631 to 624 in FIG. 6 at a first cycle. While applying the first power, the wireless power transmitter may detect a change in impedance. For example, if a foreign object is removed (Yes in step S515), the wireless power transmitter may detect a change in impedance, and may determine that the foreign object is removed. However, if a foreign object is not removed (No in step S515), the wireless power transmitter may not detect a change in impedance, and may determine that the foreign object is not removed, and may return to step S513.

If the foreign object is not removed, the wireless power transmitter may inform the user that the wireless power transmitter is now in an error state, by outputting at least one of lamp light and beep sound. Accordingly, the wireless power transmitter may include an output unit for outputting at least one of lamp light and beep sound.

If it is determined that the foreign object is not removed (No in step S515), the wireless power transmitter may return to the latch fault mode in step S513. If it is determined that the foreign object is removed (Yes in step S515, the wireless power transmitter may re-enter the power save mode in step S517. For example, the wireless power transmitter may apply second power 651 and 652, and third power 661 to 665 in FIG. 6.

As described above, the wireless power transmitter may enter the latch fault mode, if a foreign object other than the wireless power receiver is on the wireless power transmitter. In addition, the wireless power transmitter may determine whether the foreign object is removed, depending on a change in impedance, which is detected based on the power applied in the latch fault mode. In other words, in FIGS. 5 and 6, latch fault mode entry conditions may be incurred by the placement of a foreign object. In addition to the placement of a foreign object, the wireless power transmitter has various other latch fault mode entry conditions. For example, the wireless power transmitter may be cross-connected to the wireless power receiver placed thereon, and even in this case, may enter the latch fault mode.

Accordingly, upon occurrence of cross connection, a return to the initial state is required, and the wireless power transmitter requires removal of the wireless power receiver. The wireless power transmitter may set, as latch fault mode entry conditions, the cross connection that a wireless power receiver placed on another wireless power transmitter join the wireless power network.

Figure 7:
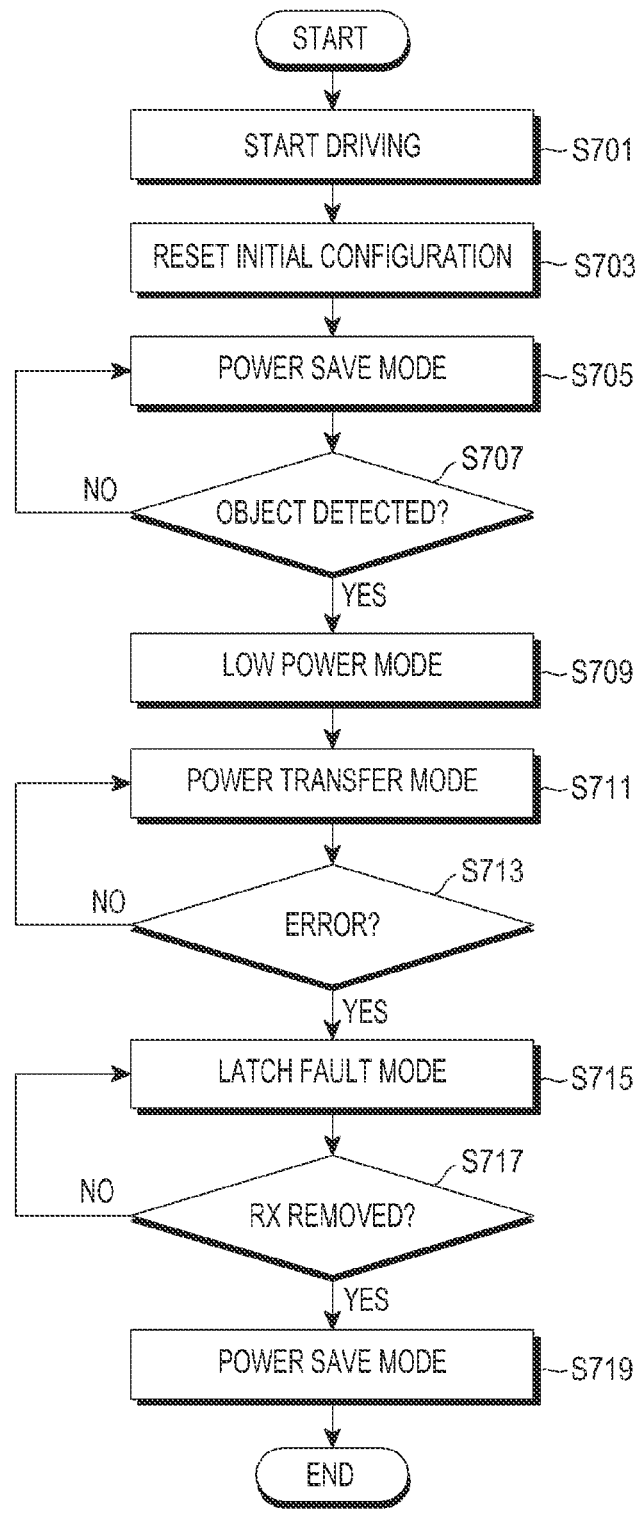
FIG. 7 illustrates a control method of a wireless power transmitter according to an embodiment of the present invention.

FIG. 7 illustrates a control method of a wireless power transmitter according to an embodiment of the present invention. The control method of FIG. 7 will be described in more detail with reference to FIG. 8, which illustrates the time axis of power applied by a wireless power transmitter in the control method of FIG. 7.

The wireless power transmitter may begin its driving, or may be powered up in step S701. In addition, the wireless power transmitter may reset its initial configuration in step S703. The wireless power transmitter may enter power save mode in step S705. The power save mode may correspond to a period in which the wireless power transmitter may apply different power, whose power values are different, to its power-transmitting unit. For example, the power save mode may correspond to a period in which the wireless power transmitter may apply second detection power 801 and 802 and third detection power 811, 812, 813, 814 and 815 in FIG. 8, to its power-transmitting unit.

The wireless power transmitter periodically may apply the second detection power 801 and 802 at a second cycle, and the wireless power transmitter may apply the second detection power 801 and 802 for a second period. The wireless power transmitter periodically may apply the third detection power 811, 812, 813, 814 and at a third cycle, and the wireless power transmitter may apply the third detection power 811, 812, 813, 814 and 815 for a third period. Although it is assumed that power values of the third detection power 811, 812, 813, 814 and 815 are different from each other, they may be optionally equal to each other.

The second detection power 801 and 802 may correspond to power with which a wireless power receiver may be driven. More specifically, the second detection power 801 and 802 may have a power value with which a control & communication unit of a wireless power receiver may be driven.

The wireless power transmitter may apply the second detection power 801 and 802 and the third detection power 811, 812, 813, 814 and 815 to a power-receiving unit at second and third cycles, respectively. If the wireless power receiver is placed on the wireless power transmitter, the impedance seen at a certain point of the wireless power transmitter may be changed. While applying the second detection power 801 and 802 and the third detection power 811, 812, 813, and 815, the wireless power transmitter may detect a change in impedance. For example, while applying the third detection power 815, the wireless power transmitter may detect a change in impedance. In this manner, the wireless power transmitter may detect an object in step S707. If no object is detected (No in step S707), the wireless power transmitter may maintain the power save mode in which it periodically may apply different power in step S705.

If an object is detected as the impedance is changed (Yes in step S707), the wireless power transmitter may enter low-power mode in step S709. The low-power mode may correspond to a mode in which the wireless power transmitter may apply driving power having a power value with which a control & communication unit of a wireless power receiver may be driven. For example, in FIG. 8, the wireless power transmitter may apply driving power 820 to its power-transmitting unit.

The wireless power receiver may receive the driving power 820 and drive its control & communication unit with the received driving power 820. Based on the driving power 820, the wireless power receiver may communicate with the wireless power transmitter using a communication scheme. For example, the wireless power receiver may transmit/receive data required for authentication, and based thereon, may join the wireless power network managed by the wireless power transmitter. Thereafter, the wireless power transmitter may enter power transfer mode in which it may transmit charging power in step S711. For example, the wireless power transmitter may apply charging power 821 as in FIG. 8, and the charging power is transmitted to the wireless power receiver.

In the power transfer mode, the wireless power transmitter may determine whether an error occurs. The term "error" as used herein may refer to placement of a foreign object on a wireless power transmitter, cross connection, over-voltage, over-current, or over-temperature. The wireless power transmitter may include a sensing unit capable of measuring or detecting over-voltage, over-current, and over-temperature. For example, the wireless power transmitter may measure the voltage or current at a reference point, and if the measured voltage or current exceeds a threshold, the wireless power transmitter may determine that the over-voltage or over-current conditions are satisfied. The wireless power transmitter may include a temperature sensing means, which may measure the temperature of the wireless power transmitter at a reference point. If the temperature at the reference point exceeds the threshold, the wireless power transmitter may determine that the over-temperature conditions are satisfied.

Figure 8:
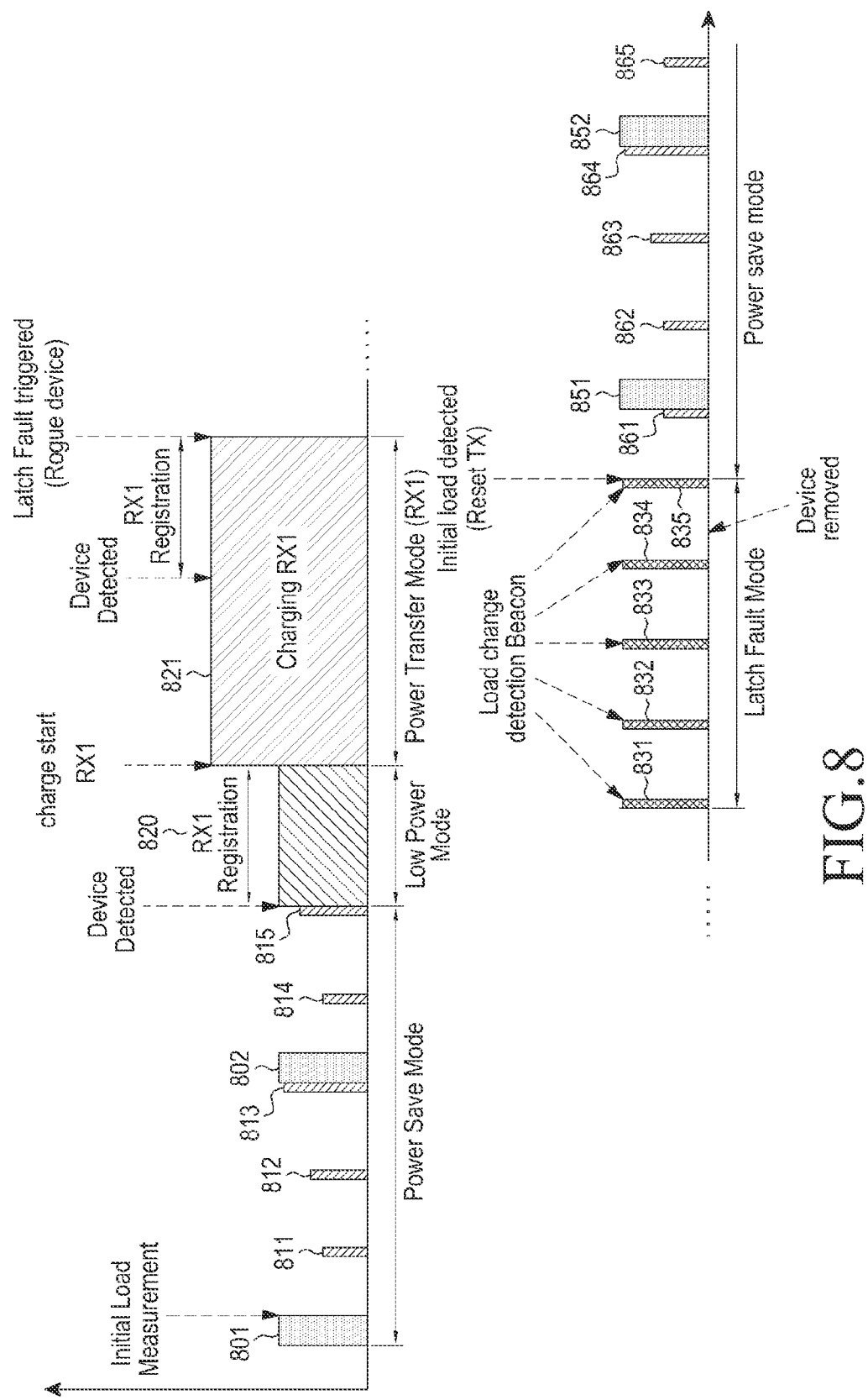
FIG. 8 illustrates the time axis of power applied by a wireless power transmitter in the control method of FIG. 7.

Although in the example of FIG. 8, an error in which a foreign object is additionally placed on the wireless power transmitter is considered, the present invention is not limited thereto, and it will be apparent to those of ordinary skill in the art that the wireless power transmitter may operate in a similar process even for the placement of a foreign object thereon, cross connection, over-voltage, over-current, and over-temperature.

If no error occurs (No in step S713), the wireless power transmitter may return to the power transfer mode in step S711. If an error occurs (Yes in step S713), the wireless power transmitter may enter latch fault mode in step S715. For example, the wireless power transmitter may apply first power 831 to 835 as in FIG. 8. In addition, the wireless power transmitter outputs error occurrence indication including at least one of lamp light and beep sound, during the latch fault mode. If it is determined that the foreign object or the wireless power receiver is not removed (No in step S717), the wireless power transmitter may return to the latch fault mode in step S715. If it is determined that the foreign object or the wireless power receiver is removed (Yes in step S717), the wireless power transmitter may re-enter the power save mode in step S719. For example, in the power save mode, the wireless power transmitter may apply second power 851 and 852 and third power 861 to 865 in FIG. 8.

To this point, the description has been made of an operation when an error occurs while the wireless power transmitter may transmit charging power. A description will now be made of an operation when a plurality of wireless power receivers on a wireless power transmitter may receive charging power.

Figure 9:
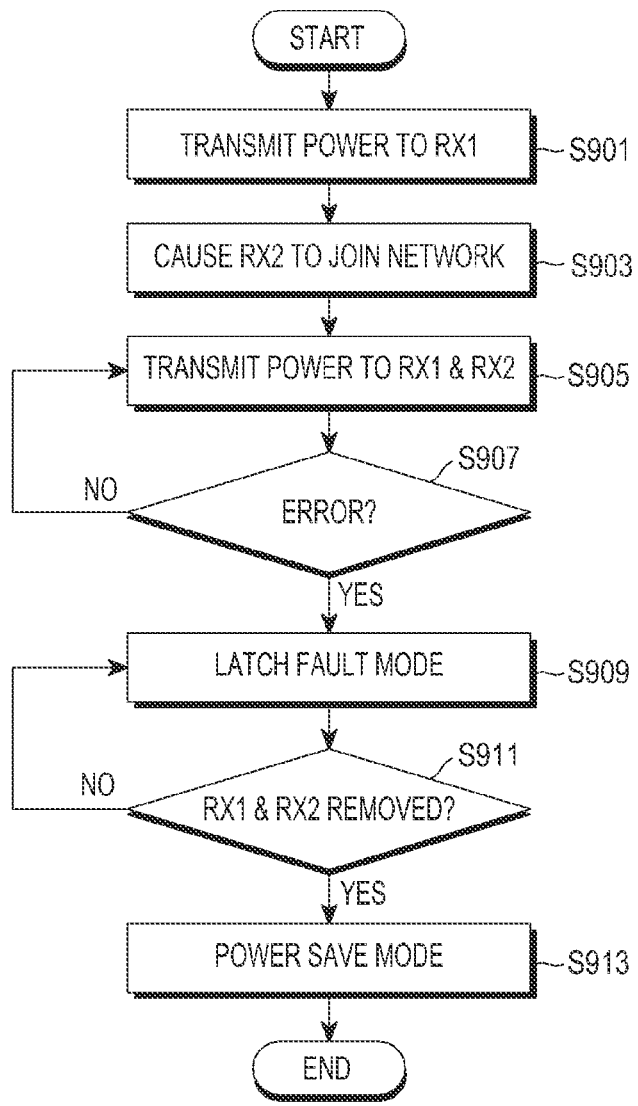
FIG. 9 illustrates a control method of a wireless power transmitter according to an embodiment of the present invention.

FIG. 9 illustrates a control method of a wireless power transmitter according to an embodiment of the present invention. The control method of FIG. 9 will be described in more detail with reference to FIG. 10, which illustrates the time axis of power applied by a wireless power transmitter in the control method of FIG. 9.

As illustrated in FIG. 9, the wireless power transmitter may transmit charging power to a first wireless power receiver in step S901. The wireless power transmitter may additionally cause a second wireless power receiver to join the wireless power network in step S903. The wireless power transmitter may transmit charging power not only to the first wireless power receiver but also to the second wireless power receiver in step S905. More specifically, the wireless power transmitter may apply, to the power-receiving unit, a sum of the charging power required by both the first and second wireless power receivers.

Figure 10:
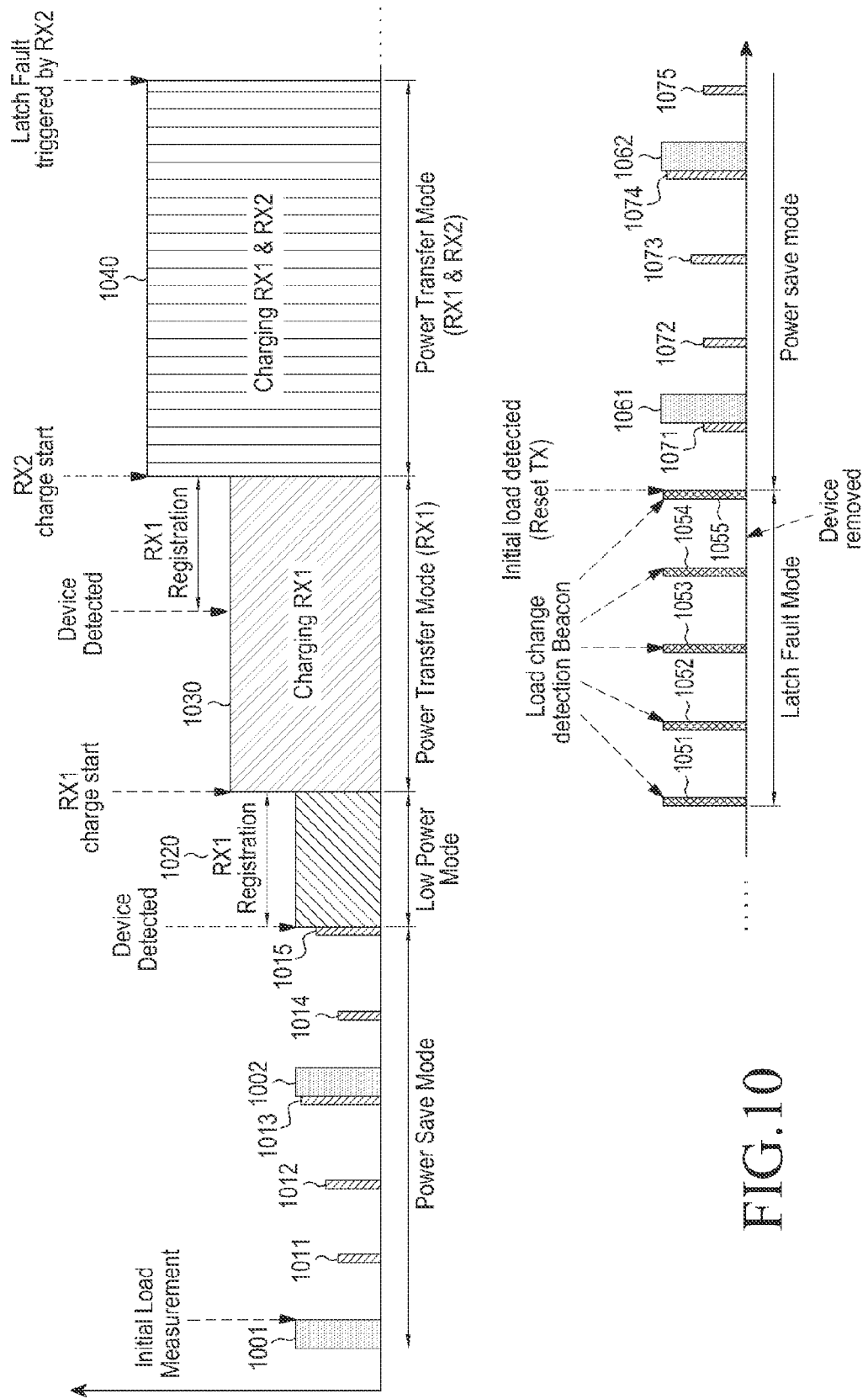
FIG. 10 illustrates the time axis of power applied by a wireless power transmitter by the control method in FIG. 9.

FIG. 10 illustrates an example of steps S901 to S905. The wireless power transmitter may maintain the power save mode in which it may apply second detection power 1001 and 1002 and third detection power 1011 to 1015. Thereafter, the wireless power transmitter may detect the first wireless power receiver, and may enter low-power mode where it may maintain detection power 1020. Thereafter, the wireless power transmitter may enter power transfer mode in which it may apply first charging power 1030. The wireless power transmitter may detect the second wireless power receiver, and cause the second wireless power receiver to join the wireless power network. In addition, the wireless power transmitter may apply second charging power 1040 having a power value corresponding to a sum of power values required by both the first and second wireless power receivers.

Referring back to FIG. 9, while transmitting the charging power to both of the first and second wireless power receivers in step S905, the wireless power transmitter may detect occurrence of an error in step S907. As described above, the term 'error' may refer to placement of a foreign object, cross connection, over-voltage, over-current, and over-temperature, for example. If no error occurs (No in step S907), the wireless power transmitter may return to step S905 to continue transmitting the charging power to both of the first and second wireless power receivers.

If an error occurs (Yes in step S907), the wireless power transmitter may enter latch fault mode in step S909. For example, in the latch fault mode, the wireless power transmitter may apply first power 1051 to 1055 in FIG. 10 at a first cycle. The wireless power transmitter may determine whether both of the first and second wireless power receivers are removed in step S911. For example, while applying the first power 1051 to 1055, the wireless power transmitter may detect a change in impedance. Based on whether the impedance may return to its initial value, the wireless power transmitter may determine whether both of the first and second wireless power receivers are removed.

If it is determined that both of the first and second wireless power receivers are removed (Yes in step S911), the wireless power transmitter may enter power save mode in step S913. For example, the wireless power transmitter may apply second detection power 1061 and 1062 and third detection power 1071 to 1075 as in FIG. 10 at second and third cycles, respectively.

As described above, even when the wireless power transmitter may apply charging power to a plurality of wireless power receivers, the wireless power transmitter may easily determine whether a wireless power receiver or a foreign object is removed, upon occurrence of an error.

Figure 11:
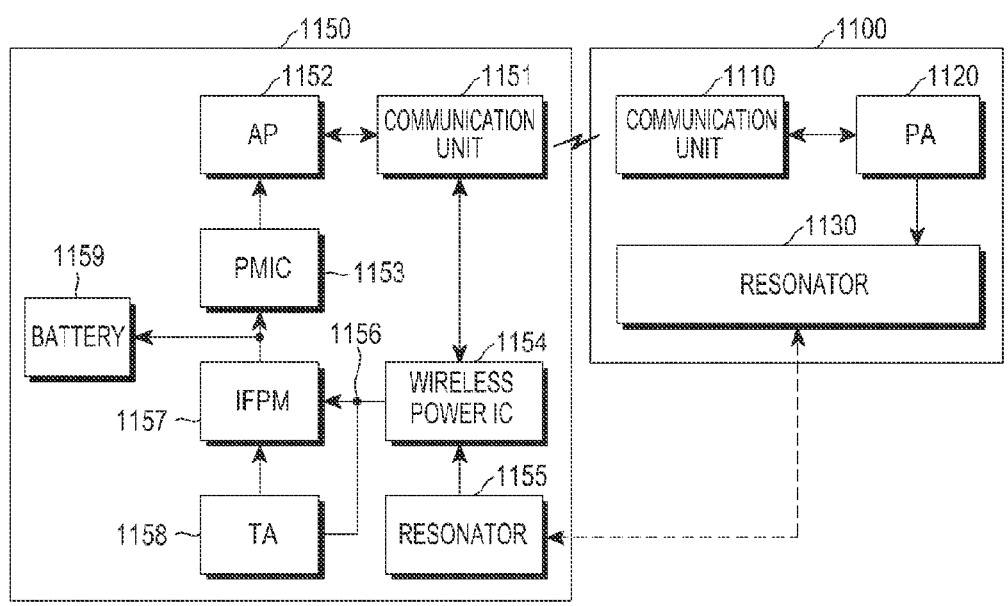
FIG. 11 is a block diagram of a wireless power transmitter and a wireless power receiver according to an embodiment of the present invention.

FIG. 11 is a block diagram of a wireless power transmitter and a wireless power receiver according to an embodiment of the present invention.

A wireless power transmitter 1100 may include a communication unit 1110, a Power Amplifier (PA) 1120, and a resonator 1130. A wireless power receiver 1150 may include a communication unit 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, and a wired charging adaptor (or Travel Adaptor (TA)) 1158, and a battery 1159.

The communication unit 1110 may communicate with the communication unit 1151 based on a communication scheme (for example, BLE). For example, the communication unit 1151 of the wireless power receiver 1150 may transmit a PRU dynamic signal having the data structure in Table 3 to the communication unit 1110 of the wireless power transmitter 1100. As described above, the PRU dynamic signal may include at least one of the wireless power receiver's voltage information, current information, temperature information, and alert information.

Based on the received PRU dynamic signal, a power value output from the power amplifier 1120 may be adjusted. For example, if over-voltage, over-current or over-temperature is applied to the wireless power receiver 1150, the power value output from the power amplifier 1120 may be reduced. In contrast, if the voltage or current of the wireless power receiver 1150 is less than a preset value, the power value output from the power amplifier 1120 may increase.

The charging power from the resonator 1130 may be wirelessly transmitted to the resonator 1155.

The wireless power IC 1154 may rectify the charging power received from the resonator 1155, and DC/DC-convert the rectified power. The wireless power IC 1154 may drive the communication unit 1151 with the converted power, or charge the battery 1159 with the rectified power.

A wired charging terminal may be inserted into the wired charging adaptor 1158. A wired charging terminal such as a 30-pin connector and a Universal Serial Bus (USB) connector is inserted into the wired charging adaptor 1158, and the wired charging adaptor 1158 may receive power supplied from the external power source, and charge the battery 1159 with the received power.

The interface power management IC 1157 may process the power applied from the wired charging terminal, and output it to the battery 1159 and the power management IC 1153.

The power management IC 1153 may manage the wirelessly received power, the power received by wire, or the power applied to components of the wireless power receiver

1150. The AP 1152 may receive power information from the power management IC 1153, and control the communication unit 1151 to transmit a PRU dynamic signal for reporting the received power information.

A node 1156 connected to the wireless power IC 1154 may be connected even to the wired charging adaptor 1158. If a wired charging connector is inserted into the wired charging adaptor 1158, a preset voltage (for example, 5V) may be applied to the node 1156. The wireless power IC 1154 may monitor the voltage applied to the node 1156 to determine whether the wired charging adaptor 1158 is inserted.

Figure 12:
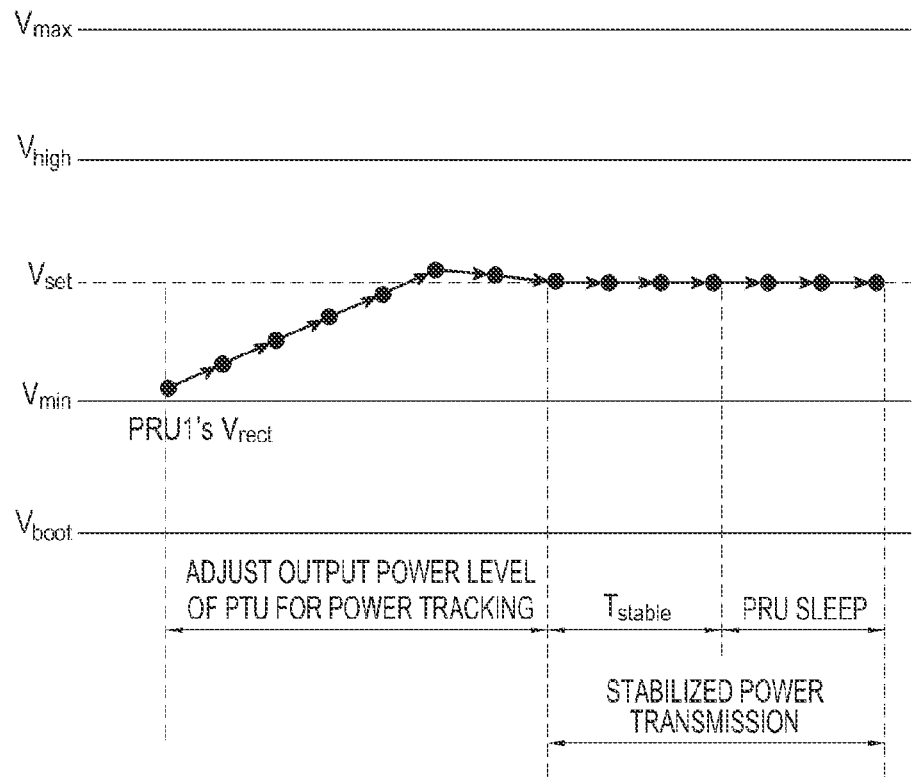
FIG. 12 illustrates a power level for transitioning to a sleep mode according to an embodiment of the present invention.

FIG. 12 illustrates a power level for transitioning to a sleep mode according to an embodiment of the present invention.

In the wireless charging system, upon its initial connection, each wireless Power Receiver Unit (or PRU) may transmit a PRU static signal to a wireless Power Transmitter Unit (or PTU), for wireless charging, as described above. The PRU static signal may include information about various voltage values such as $V_{max}$, $V_{high}$, $V_{set}$ and $V_{min}$.

Referring to FIG. 12, if charging begins, a PTU may adjust its transmission power level by collecting dynamic values (including Vmax, Vhigh, Vset and Vmin) that is periodically reported by a PRU. The PTU may adjust its power so that the PRU has the optimal value $V_{rect}$ (=$V_{set}$), or may adjust its power so that the PRU has the optimal efficiency.

Therefore, if the power is tracked by adjusting the output power level of the PTU, a value $V_{rect}$ may converge on a preset value $V_{set}$.

As such, if a value Vrect is stabilized at a certain value (for example, Vset) by the adjustment of the PTU's output power level, the PRU is likely to maintain the same power level, so the PRU does not need to continuously transmit the PRU dynamic signal.

In other words, if the PRU's V, reaches an optimal point, the PTU may no longer adjust the power. This may be defined as a state in which power is stabilized. For example, if the power is not adjusted for a period of time, this may not be defined as a stabilized state (or a steady state).

As such, while charging its battery with the stabilized power, the PRU may not need to report its state to the PTU at a short cycle. For example, the PRU may not need to transmit the PRU dynamic signal.

Therefore, in accordance with an embodiment of the present invention, if the stabilized state lasts for a preset time (for example, $T_{stable}$) or more, a transmission cycle of a signal (for example, a PRU dynamic signal) reported to the PTU by the PRU is increased to prevent an unnecessary waste of transmission power, enabling a transition to the sleep mode in which an RF communication unit may be turned off.

Figure 13:
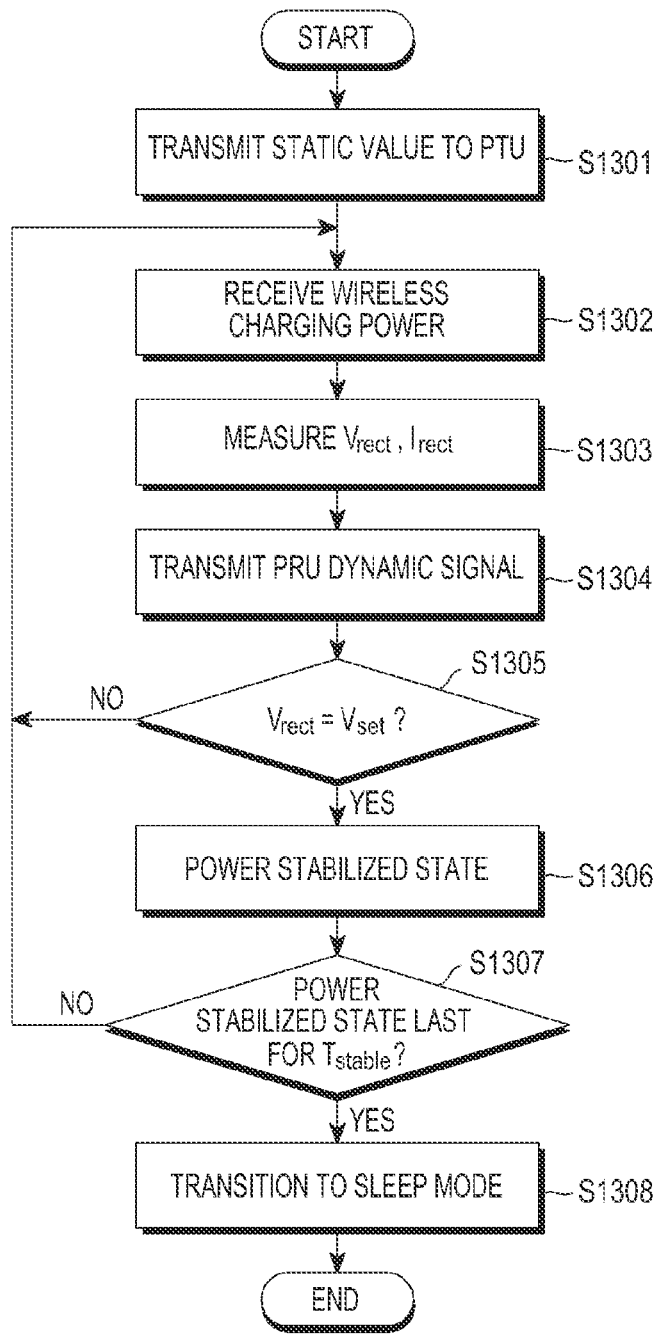
FIG. 13 illustrates a procedure for transitioning to a sleep mode in a wireless power receiver according to an embodiment of the present invention.

FIG. 13 illustrates a procedure for transitioning to a sleep mode in a wireless power receiver according to an embodiment of the present invention. Referring to FIG. 13, upon its initial connection to a PTU, a PRU may transmit various static values to the PTU in step S1301. As described above, the PRU static signal may include various voltage level values. Therefore, the PTU may control the transmission power for wireless charging with respect to the PRU based on the voltage level.

If charging begins, the PRU may receive wireless charging power from the PTU in step S1302. The PRU may measure $V_{rect}$ and $I_{rect}$ at preset intervals in step S1303, and may transmit the measured signal in a PRU dynamic signal to the PTU in step S1304. Therefore, the PTU may receive the PRU dynamic signal from each PRU at preset intervals.

If the measured $V_{rect}$ reaches the preset $V_{set}$ as illustrated in the graph of FIG. 12 in step S1305, the PRU may determine the current state as a power-stabilized state in step S1306. If the power-stabilized state lasts for a preset time $T_{stable}$ or more in step S1307, the PRU may transition to the sleep mode in step S1308.

Figure 14:
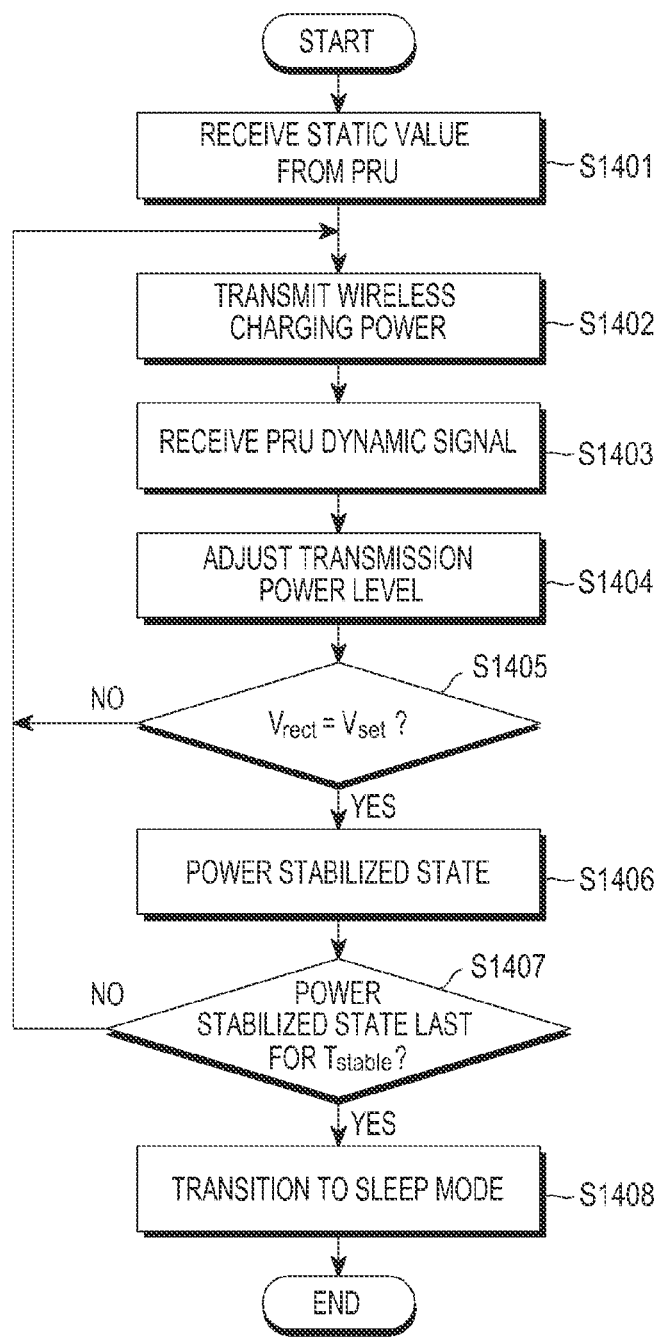
FIG. 14 illustrates a procedure for transitioning to a sleep mode in a wireless power transmitter according to an embodiment of the present invention.

FIG. 14 illustrates a procedure for transitioning to a sleep mode in a wireless power transmitter according to an embodiment of the present invention. Referring to FIG. 14, upon PRU's initial connection to a PTU, the PTU may receive various static values from the PRU in step S1401. As described above, the PRU static signal may include various voltage level values. Therefore, the PTU may control the transmission power for wireless charging with respect to the PRU based on the voltage level.

If charging begins, the PTU may transmit wireless charging power to the PRU in step S1402. In response, the PRU may transmit a PRU dynamic signal at preset intervals. Therefore, the PTU may receive the PRU dynamic signal from each PRU at stated intervals in step S1403. Since the PRU dynamic signal includes PRU's charging power level-related information, the PTU may adjust its transmission power level based on the PRU dynamic signal in step S1404.

If $V_{rect}$ reaches the preset $V_{set}$ due to the adjustment of the transmission power level as illustrated in the graph of FIG. 12 in step S1405, the PTU may determine the current state as a power-stabilized state in step S1406. If the power-stabilized state lasts for a preset time $T_{stable}$ or more in step S1407, the PTU may cause the PRU to transition to the sleep mode according to an embodiment of the present invention in step S1408.

In accordance with another embodiment of the present invention, even though $V_{rect}$ does not reach $V_{set}$, the PTU may be implemented to cause the PRU to transition to the sleep mode if it maintains a constant voltage for a period of time.

Figure 15:
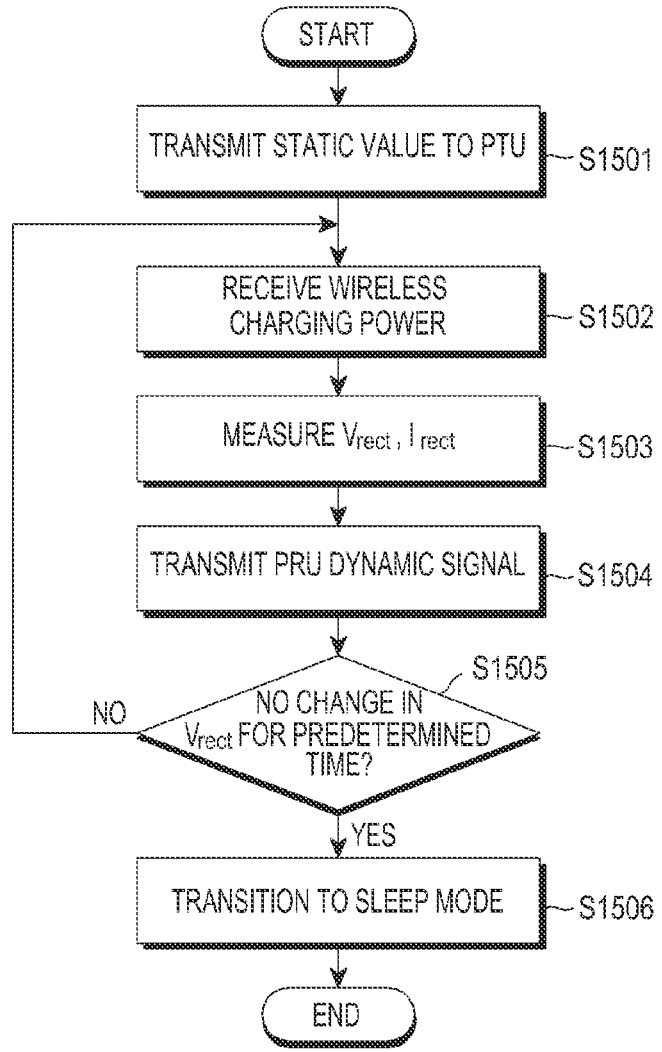
FIG. 15 illustrates a procedure for transitioning to a sleep mode in a wireless power receiver according to another embodiment of the present invention.

FIG. 15 illustrates a procedure for transitioning to a sleep mode in a wireless power receiver according to another embodiment of the present invention. Referring to FIG. 15, upon its initial connection to a PTU, a PRU may transmit various static values to the PTU in step S1501. As described above, the PRU static signal may include various voltage level values. Therefore, the PTU may control the transmission power for wireless charging with respect to the PRU based on the voltage level.

If charging begins, the PRU may receive wireless charging power from the PTU in step S1502. The PRU may measure $V_{rect}$ and $I_{rect}$ at preset intervals in step S1503, and may transmit the measured signal in a PRU dynamic signal to the PTU in step S1504. Therefore, the PTU may receive the PRU dynamic signal from each PRU at preset intervals.

If there is no change in the measured $V_{rect}$ for at least a preset time in step S1505, the PRU may transition to the sleep mode in step S1506.

Figure 16:
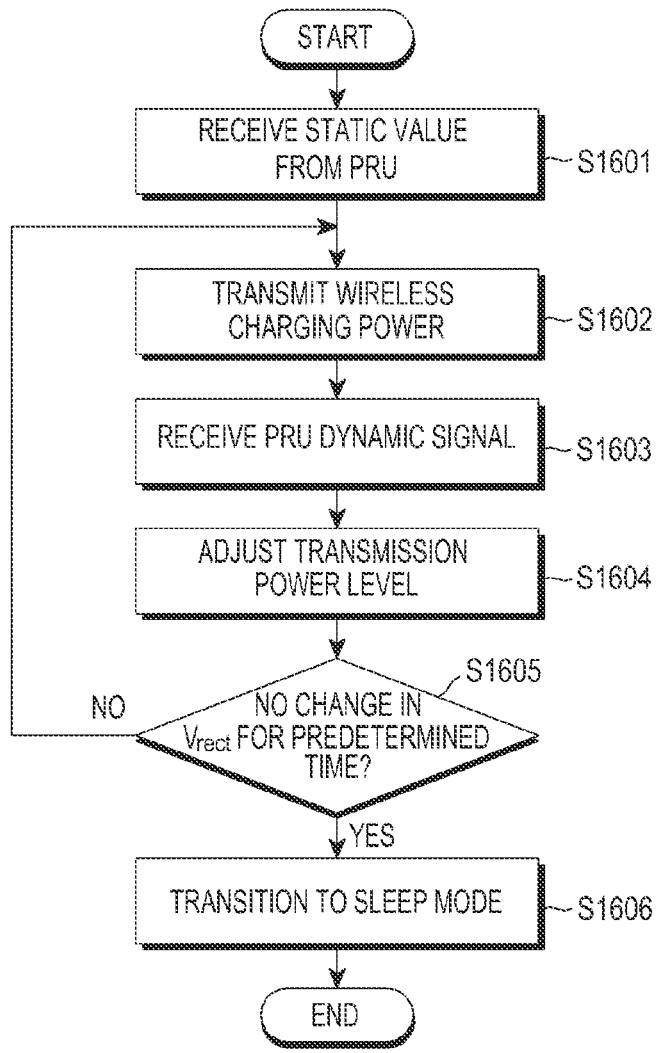
FIG. 16 illustrates a procedure for transitioning to a sleep mode in a wireless power transmitter according to another embodiment of the present invention.

FIG. 16 illustrates a procedure for transitioning to a sleep mode in a wireless power transmitter according to another embodiment of the present invention. Referring to FIG. 16, upon the PRU's initial connection to a PTU, the PTU may receive various static values from the PRU in step S1601. As described above, the PRU static signal may include various voltage level values. Therefore, the PTU may control the transmission power for wireless charging with respect to the PRU based on the voltage level.

If charging begins, the PTU may transmit wireless charging power to the PRU in step S1602. In response, the PRU may transmit a PRU dynamic signal at preset intervals. Therefore, the PTU may receive the PRU dynamic signal from each PRU at stated intervals in step S1603. Since the PRU dynamic signal includes PRU's charging power level-related information, the PTU may adjust its transmission power level based on the PRU dynamic signal in step S1604.

If there is no change in the $V_{rect}$ for a certain time or more in step S1605, the PTU causes the PRU to transition to the sleep mode in step S1606.

Figure 17:
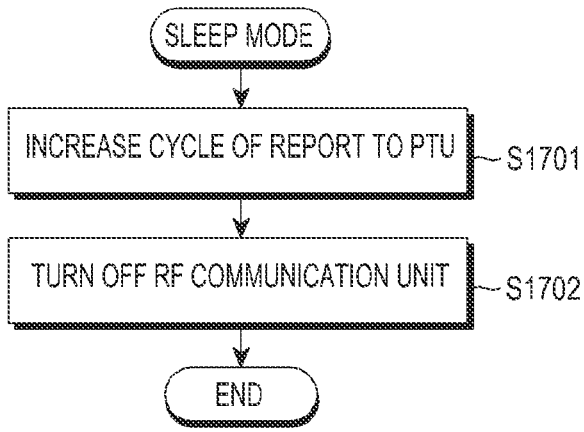
FIG. 17 illustrates a processing procedure in a sleep mode in a wireless power receiver according to an embodiment of the present invention.

FIG. 17 illustrates a processing procedure in a sleep mode in a wireless power receiver according to an embodiment of the present invention. Referring to FIG. 17, if a PRU transitions to the sleep mode in the above manner, the PRU increases a transmission cycle of a PRU dynamic signal to a PTU in step S1701, enabling a reduction in the power consumption. In addition, the PRU turns off its RF communication unit in step S1702, thus preventing an unnecessary waste of transmission power.

Figure 18:
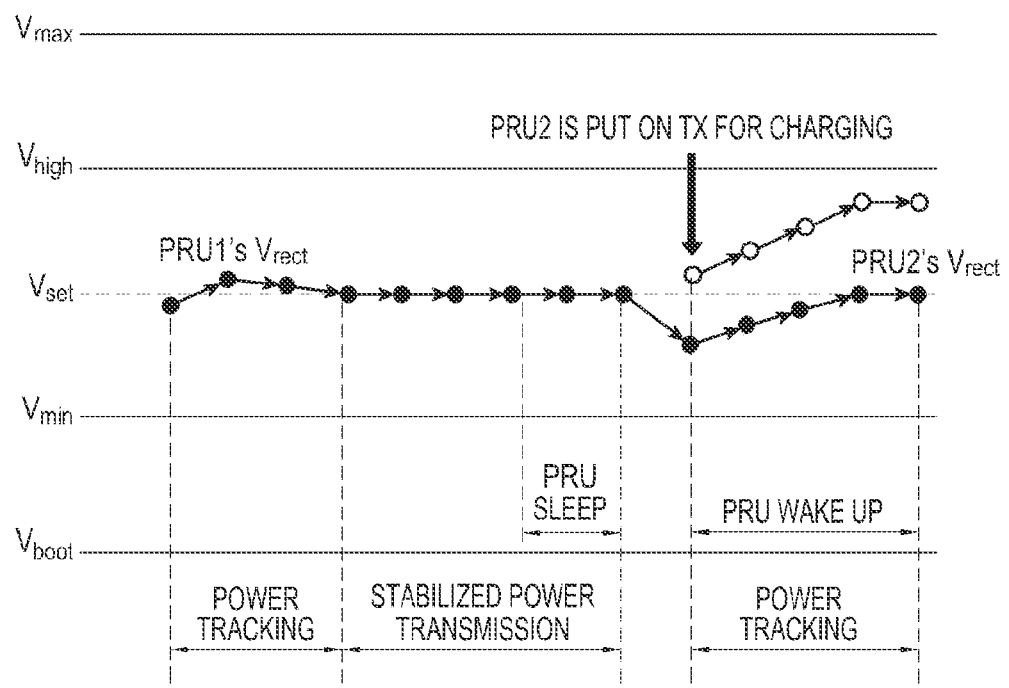
FIG. 18 illustrates a power level for causing a wireless power receiver to wake up from a sleep mode according to an embodiment of the present invention.

FIG. 18 illustrates a power level for causing a wireless power receiver to wake up from a sleep mode according to an embodiment of the present invention. As described above, if another PRU may enter a charging area of a PTU after a PRU has transitioned to a sleep mode, a change in $V_{rect}$ of the PRU may occur as illustrated in FIG. 18 since the charging power is distributed.

Each PRU needs to report the change to the PTU, and the PTU may re-calculate the power required for charging, and may transmit the optimal power to the PRUs.

Therefore, the PRU needs to continuously monitor $V_{rect}$ or $I_{rect}$ even in the sleep mode, to determine whether there is any change in the power received from the PTU.

Upon detecting a change in the power transmitted from the PTU as illustrated in FIG. 18, the PRU needs to wake up from the sleep mode by itself and transition to a state preceding the sleep mode, or to an awake mode state. For example, the PRU needs to wake up its RU communication unit, and transition to a state where it can listen to requirements of the PTU.

Upon detecting a load, or detecting a change in the power being transmitted, a PTU may request all of its current PRUs to report their own power transmission state, to determine whether a new PRU has entered the network, or a foreign object has entered the network. Accordingly, if it is determined that a new PRU has entered the network, the PTU re-sets the required total power based on the reports from the PRUs, and may transmit the re-set power.

Figure 19:
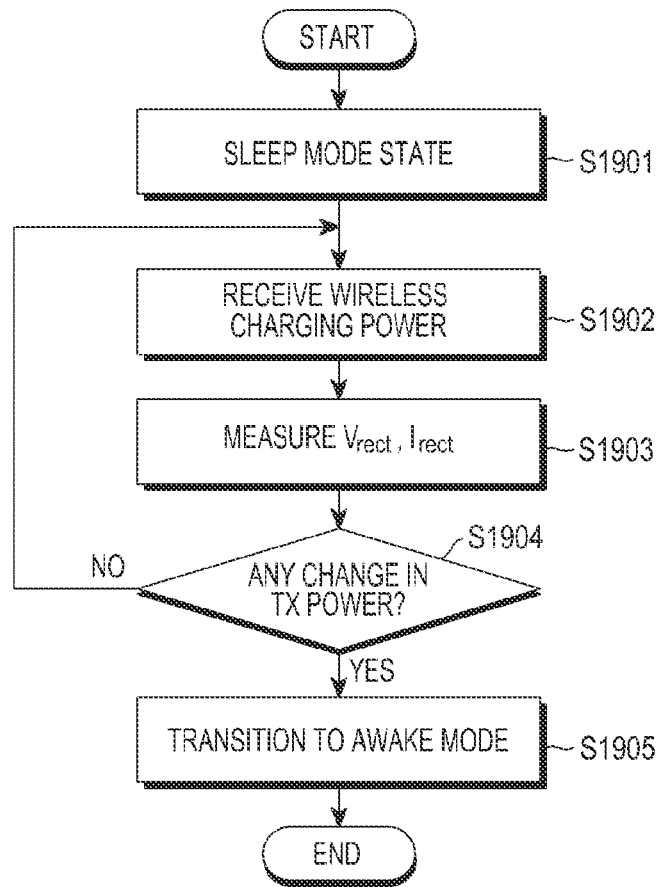
FIG. 19 illustrates a procedure for transitioning to an awake mode in a wireless power receiver according to an embodiment of the present invention.

FIG. 19 illustrates a procedure for transitioning to an awake mode in a wireless power receiver according to an embodiment of the present invention. Referring to FIG. 19, in the sleep mode state in step S1901, a PRU may receive wireless charging power in step S1902). As in the state preceding the sleep mode, the PRU measures $V_{rect}$ and $I_{rect}$ at preset intervals in step S1903, and may transmit the measured signal in a PRU dynamic signal to a PTU. However, since the PRU is in the sleep mode state, the transmission cycle of the PRU dynamic signal may increase compared to when the PRU is in the state preceding the sleep mode state, thus enabling reduced power consumption due to the repeated transmission of the PRU dynamic signal. The measurement cycle for $V_{rect}$ and $I_{rect}$ may further increase depending on the change in transmission cycle of the PRU dynamic signal, or measures them at the same cycle as that in the state preceding the sleep mode state without the further increase.

If there is a change in the power transmitted from the PTU in step S1904, the PRU may wake up without remaining in the sleep mode state, and transition to the awake mode or transition to the state preceding the sleep mode in step S1905. Due to the transition, the transmission cycle of the PRU dynamic signal decreases as in the state preceding the sleep mode.

Figure 20:
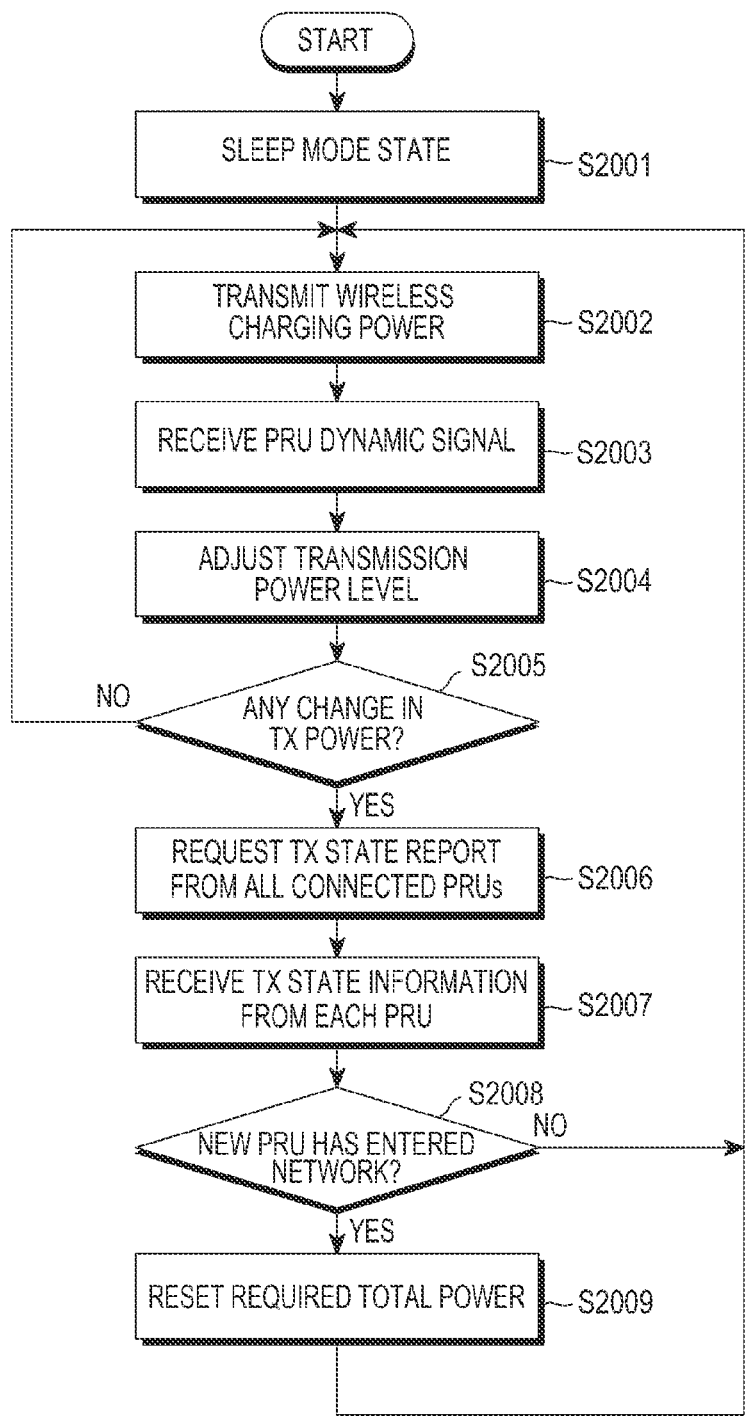
FIG. 20 illustrates a procedure for transitioning to an awake mode in a wireless power transmitter according to an embodiment of the present invention.

FIG. 20 illustrates a procedure for transitioning to an awake mode in a wireless power transmitter according to an embodiment of the present invention. Referring to FIG. 20, in the sleep mode state in step S2001, a PTU may transmit wireless charging power to a PRU in step S2002. In response, the PTU may receive a PRU dynamic signal from the PRU in step S2003. However, since the PTU is in the sleep mode state, the transmission cycle of the PRU dynamic signal increases compared to when the PTU is in the state preceding the sleep mode state, thus enabling reduced power consumption due to the repeated transmission of the PRU dynamic signal.

The PTU may adjust a level of its transmission power to the PRU based on the received PRU dynamic signal in step S2004. Since the transmission cycle of the PRU dynamic signal increases, the adjustment cycle of the transmission power level may also increase.

If there is a change in transmission power of the PTU, the PRU may wake up without remaining in the sleep mode state, and transition to the awake mode or transition to the state preceding the sleep mode.

Since the change in the transmission power has occurred by the new PRU as illustrated in FIG. 18 in step S2005, the PTU may request all of its connected PRUs to report the transmission state in step S2006. Accordingly, the PTU may receive transmission status information from each PRU in step S2007, and determine whether a new PRU has entered the network, based on the received transmission status information in step S2008.

If it is determined that a new PRU has entered the network, the PTU may re-set the required total power in step S2009.

As is apparent from the foregoing description, according to the present invention, if a charging power level is stabilized while a wireless power transmitter may charge a wireless power receiver, the wireless power receiver changes a transmission cycle of a PRU dynamic signal transmitted to the wireless power transmitter, thereby enabling a reduction in unnecessary power consumption.

While the invention has been shown and described with reference to certain embodiments thereof, it will be understood by those skilled in the art that various changes in form and details could be made therein without departing from the spirit and scope of the invention as defined by the appended claims and their equivalents.

What is claimed is:

1. A method for setting a sleep mode in a wireless power receiver that may receive wireless charging power from a wireless power transmitter, comprising:
    receiving wireless charging power from the wireless power transmitter;
    determining a charging voltage based on the received wireless charging power;
    transmitting a signal, including voltage information corresponding to the determined charging voltage, to the wireless power transmitter;
    if the determined charging voltage reaches a preset first voltage, determining a duration for which the determined charging voltage maintains the preset first voltage; and
    changing a transmission cycle of the signal including the voltage information, if the duration exceeds a preset time.

2. The method of claim 1, wherein changing the transmission cycle of the signal including the voltage information comprises:
    transitioning to a sleep mode, if the duration exceeds the preset time; and
    increasing, upon transition to the sleep mode, the transmission cycle of the signal.

3. The method of claim 2, wherein the signal including the voltage information includes a Power Reception Unit (PRU) dynamic signal.

4. The method of claim 1, further comprising:
turning off a Radio Frequency (RF) communication unit of the wireless power receiver, after changing the transmission cycle.

5. The method of claim 1, wherein the voltage information is a voltage value of a rear end of a rectifier of the wireless power receiver.

6. The method of claim 1, further comprising:
transitioning to a preceding state, if there is a change in the received wireless charging power after changing the transmission cycle.

7. A method for setting a sleep mode in a wireless power receiver that may receive wireless charging power from a wireless power transmitter, comprising:
receiving wireless charging power from the wireless power transmitter;
determining a charging voltage based on the received wireless charging power;
transmitting a signal, including voltage information corresponding to the determined charging voltage, to the wireless power transmitter; and
changing a transmission cycle of the signal including the voltage information,
if the determined charging voltage is maintained for at least a preset time.

8. The method of claim 7, wherein changing the transmission cycle of the signal including the voltage information comprises:
transitioning to a sleep mode, if the determined charging voltage is maintained for at least a preset time; and
increasing, upon transition to the sleep mode, the transmission cycle of the signal.

9. The method of claim 8, wherein the signal including the voltage information includes a Power Reception Unit (PRU) dynamic signal.

10. The method of claim 7, further comprising:
turning off a Radio Frequency (RF) communication unit of the wireless power receiver, after changing a transmission cycle.

11. The method of claim 7, wherein the voltage information is a voltage value of a rear end of a rectifier of the wireless power receiver.

12. The method of claim 7, further comprising:
transitioning to a preceding state, if there is a change in the received wireless charging power after changing the transmission cycle.

13. A wireless power receiver for performing wireless charging by receiving wireless charging power from a wireless power transmitter, comprising:
a power-receiving unit receiving wireless charging power from the wireless power transmitter; and
a controller configured to determine a charging voltage based on the received wireless charging power, if the determined charging voltage reaches a preset first voltage, transmit a signal, including voltage information corresponding to the determined charging voltage, to the wireless power transmitter, determine a duration for which the determined charging voltage maintains the preset first voltage, and change a transmission cycle of the signal including the voltage information, if the duration exceeds a preset time.

14. The wireless power receiver of claim 13, further comprising:
a communication unit transmitting the signal, including the voltage information corresponding to the determined charging voltage, to the wireless power transmitter at preset intervals,
the controller transitions to a sleep mode, if the duration exceeds the preset time, and increases, upon transition to the sleep mode, the transmission cycle of the signal.

15. The wireless power receiver of claim 14, wherein the signal including the voltage information includes a Power Reception Unit (PRU) dynamic signal.

16. The wireless power receiver of claim 13, wherein after changing the transmission cycle, the controller turns off a Radio Frequency (RF) communication unit of the wireless power receiver.

17. The wireless power receiver of claim 13, wherein the voltage information is a voltage value of a rear end of a rectifier of the wireless power receiver.

18. The wireless power receiver of claim 13, wherein if there is a change in the received wireless charging power after changing the transmission cycle, the controller transitions to a preceding state.

19. A wireless power receiver for performing wireless charging by receiving wireless charging power from a wireless power transmitter, comprising:
a power-receiving unit receiving wireless charging power from the wireless power transmitter; and
a controller configured to determine a charging voltage based on the received wireless charging power, transmit a signal, including voltage information corresponding to the determined charging voltage, to the wireless power transmitter, and change a transmission cycle of the signal including the voltage information, if the determined charging voltage is maintained for at least a preset time.

20. The wireless power receiver of claim 19, further comprising:
a communication unit transmitting the signal, including the voltage information, to the wireless power transmitter at preset intervals,
wherein the controller transitions to the sleep mode, if the determined charging voltage is maintained for at least a preset time, and increases, upon transition to the sleep mode, a transmission cycle of the signal including the determined charging voltage.

21. The wireless power receiver of claim 20, wherein the signal including the voltage information includes a Power Reception Unit (PRU) dynamic signal.

22. The wireless power receiver of claim 19, wherein after changing the transmission cycle, the controller turns off a Radio Frequency (RF) communication unit of the wireless power receiver.

23. The wireless power receiver of claim 19, wherein the voltage information is a voltage value of a rear end of a rectifier of the wireless power receiver.

24. The wireless power receiver of claim 19, wherein the controller transitions to a preceding state, if there is a change in the received wireless charging power, after changing the transmission cycle.

* * * * *